(12) United States Patent
Amirabadi

(10) Patent No.: US 10,848,071 B2
(45) Date of Patent: Nov. 24, 2020

(54) HIGHLY RELIABLE AND COMPACT UNIVERSAL POWER CONVERTER

(71) Applicants: Northeastern University, Boston, MA (US); The Board of Trustees of the University of Illinois, Urbana, IL (US)

(72) Inventor: Mahshid Amirabadi, Lexington, MA (US)

(73) Assignees: Northeastern University, Boston, MA (US); The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 15/548,476

(22) PCT Filed: Feb. 4, 2016

(86) PCT No.: PCT/US2016/016558
§ 371 (c)(1),
(2) Date: Aug. 3, 2017

(87) PCT Pub. No.: WO2016/126937
PCT Pub. Date: Aug. 11, 2016

(65) Prior Publication Data
US 2018/0019655 A1   Jan. 18, 2018

Related U.S. Application Data

(60) Provisional application No. 62/111,725, filed on Feb. 4, 2015.

(51) Int. Cl.
*H02M 5/22* (2006.01)
*H02M 5/458* (2006.01)
*H02M 7/48* (2007.01)

(52) U.S. Cl.
CPC ........... *H02M 5/225* (2013.01); *H02M 5/458* (2013.01); *H02M 7/4826* (2013.01);
(Continued)

(58) Field of Classification Search
CPC ........ H02M 1/08; H02M 1/083; H02M 3/158; H02M 5/4585; H02M 2001/0058; H02M 5/225; H02M 5/485; H02M 7/4826
See application file for complete search history.

(56) References Cited

U.S. PATENT DOCUMENTS

| | | | |
|---|---|---|---|
| 8,988,900 B2 | 3/2015 | Toliyat et al. | |
| 2009/0059634 A1* | 3/2009 | Otake | H02M 7/538 363/132 |

(Continued)

FOREIGN PATENT DOCUMENTS

WO   03/001314 A1   1/2003

*Primary Examiner* — Jue Zhang
(74) *Attorney, Agent, or Firm* — Verrill Dana, LLP

(57) ABSTRACT

A universal power converter of the present application may include a link stage between an input stage and an output stage that operates at a higher frequency than the frequency of the input power source. As a result, a more compact capacitor may be used, thus reducing the size of the power converter. In some embodiments, the link stage may be a partially resonant link that permits zero current switching (ZCS). ZCS operation may reduce switching losses during operation. Universal power converters of the present application utilizing ZCS may be implemented using naturally commutated switches, such as silicon controlled rectifiers (SCRs), instead of transistor switches. Such power converters utilizing SCRs may be more reliable than power converters utilizing transistor switches. Additionally, control circuitry required to operate such power converters may be simplified. Accordingly, a more compact, efficient, and reliable universal power converter may be achieved.

37 Claims, 45 Drawing Sheets

(52) U.S. Cl.
CPC .... *H02M 2007/4815* (2013.01); *Y02B 70/145* (2013.01); *Y02B 70/1441* (2013.01)

(56) References Cited

U.S. PATENT DOCUMENTS

| | | |
|---|---|---|
| 2011/0074361 A1 | 3/2011 | Tao et al. |
| 2011/0261599 A1 | 10/2011 | Duerbaum et al. |
| 2012/0307531 A1* | 12/2012 | Toliyat ................ H02M 5/4585 363/36 |
| 2013/0314948 A1* | 11/2013 | Perreault ............... H02M 7/497 363/8 |
| 2014/0169049 A1 | 6/2014 | Chandrasekaran |
| 2014/0286059 A1 | 9/2014 | Tollyat et al. |

* cited by examiner

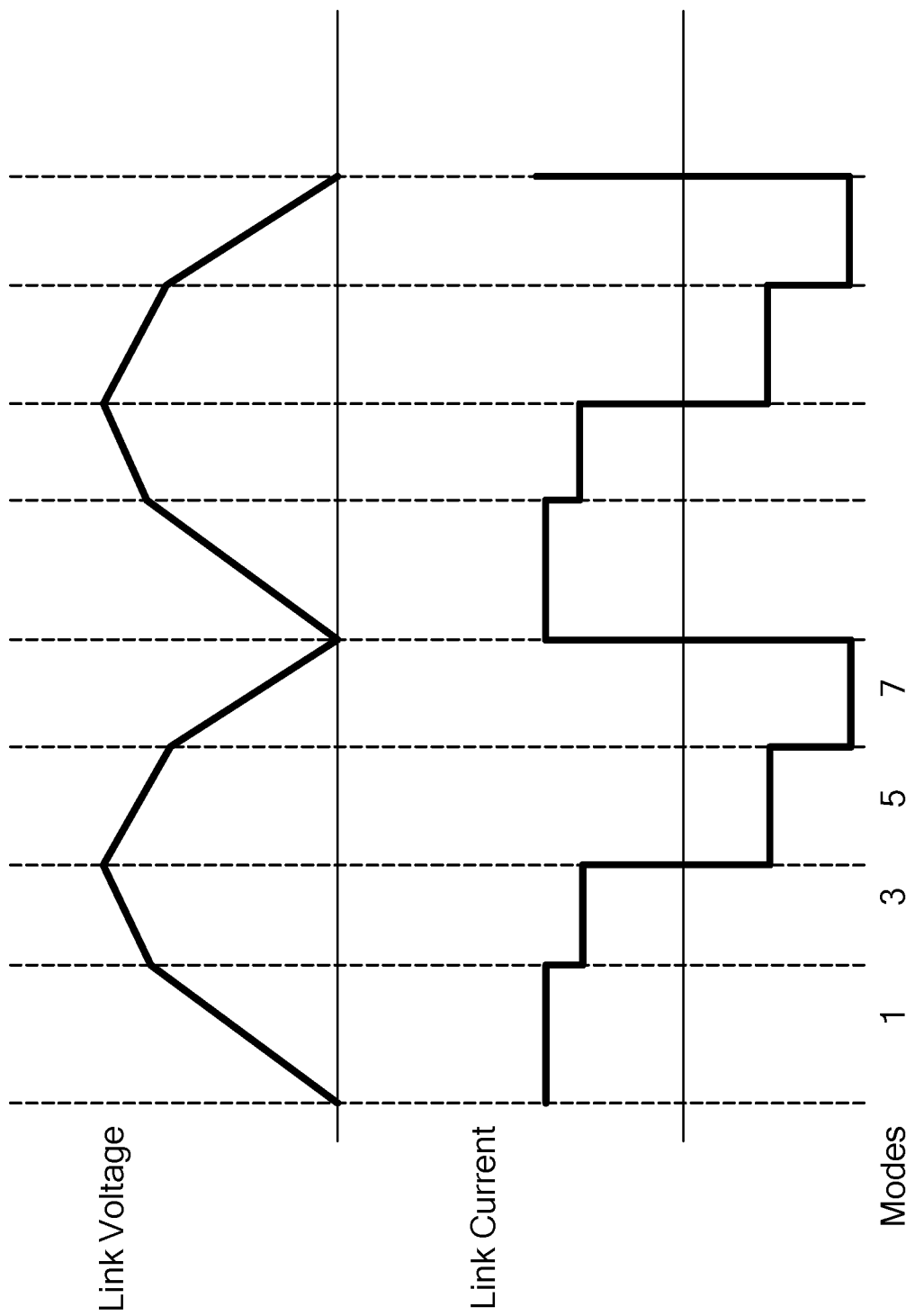

HIGHLY RELIABLE AND COMPACT UNIVERSAL POWER CONVERTER

CROSS REFERENCE TO RELATED APPLICATIONS

This application claims priority under 35 § 119(e) of U.S. Provisional Application No. 62/111,725, filed on Feb. 4, 2015, entitled "Highly Reliable and Compact Universal Power Converter," the disclosure of which is hereby incorporated by reference.

STATEMENT REGARDING FEDERALLY SPONSORED RESEARCH OR DEVELOPMENT

N/A

BACKGROUND

In the modern era, electrically-powered devices have become ubiquitous. A power source for an electrically-powered device often has a set of static characteristics—such as a voltage level, a minimum or maximum current, and a frequency—that do not align with those required by the device. As one example, a source voltage may need to be reduced to safely power a given device. As another example, a power source utilizes alternating current (AC) while a given device requires direct current (DC) power. Accordingly, a power converting device is required to convert power from a power source to have characteristics compatible with an electrical device.

In some instances, a DC power source will have a voltage level that is different from the voltage level required by a DC-powered device, and a buck or boost converter may be employed to provide the necessary voltage conversion. In other instances, an AC power source will have a voltage level that is different from the voltage level required by an AC-powered device, and a transformer may be employed to provide the necessary change in voltage. In further instances, an AC power source may be used to power a DC-powered device, and a rectifier may be employed to provide the AC-DC conversion. In yet further instances, a DC power source may be used to power an AC-powered device, and an inverter may be employed to provide the DC-AC conversion. However, these power conversion techniques may only be applied in a particular conversion between DC-DC, AC-AC, AC-DC, or DC-AC. Additionally, such power converters require large components, and thus suffer from a relatively low power density.

Some power converters utilize switches—typically in the form of bipolar transistors or field effect transistors (FETs) or Insulated Gate Bipolar Transistor (IGBT)—in order to control the type of power conversion (e.g. DC-DC, AC-AC, AC-DC, and DC-AC), the voltage change, and the frequency change, among other power characteristics. These switches, when coupled with diodes, can be configured to facilitate rectification, inversion, or simply allow current to flow without changing its frequency. These power converters typically involve one or more reactive components that facilitate the change in voltage in a similar manner as buck or boost converters. While such power converters provide a more universal control over the type of power conversion, the switches increase the failure rate of the power converter. Depending on the desired power conversion, a single switch failure may prevent the power converter from operating correctly.

SUMMARY OF THE INVENTION

The invention relates to a universal power converter that can include a link stage between an input stage and an output stage that operates at a higher frequency than the frequency of the input power source. As a result, a more compact capacitor may be used, thus reducing the size of the power converter. In some embodiments, the link stage may be a partially resonant link that permits zero current switching (ZCS). ZCS operation may reduce switching losses during operation. Universal power converters of the present application utilizing ZCS may be implemented using naturally commutated switches, such as silicon controlled rectifiers (SCRs), instead of transistor switches. Such power converters utilizing SCRs may be more reliable than power converters utilizing transistor switches. Additionally, control circuitry required to operate such power converters may be simplified. Accordingly, a more compact, efficient, and reliable universal power converter may be achieved. Control schemes for operating at fixed or variable switching frequency are also provided.

Other aspects of the method and system include the following:

1. A power conversion device comprising:
    an input stage comprising a plurality of forward-blocking bidirectional-conducting devices or bidirectional-blocking bidirectional-conducting devices that are controllable in at least one direction, wherein the input stage is configured to be coupled to a power source;
    a link stage comprising at least one reactive component; and
    an output stage comprising a plurality of forward-blocking bidirectional-conducting devices or bidirectional-blocking bidirectional-conducting devices that are controllable in at least one direction, wherein the output stage is configured to be coupled to a load and control current output to the load.
2. The device of item 1, wherein the link stage comprises at least one reactive component of a series partially resonant inductor-capacitor (LC) circuit.
3. The device of item 2, wherein the at least one reactive component of the series partially resonant LC circuit comprises a capacitor, and wherein the series resonant LC circuit is formed by capacitance of the capacitor together with parasitic inductance of the capacitor.
4. The device of item 2, wherein the series partially resonant LC circuit comprises an inductor connected in series with a capacitor, and wherein the series partially resonant LC circuit is formed by inductance of the inductor together with capacitance of the capacitor.
5. The device of item 2, wherein the series partially resonant link circuit has a frequency that is greater than a frequency of the power source.
6. The device of any of items 1-5, wherein the link stage comprises at least two reactive components of a series partially resonant circuit, wherein the series partially resonant circuit is configured for alternating current (AC) operation.
7. The device of any of items 1-6, wherein the power source is a direct current (DC) power source.
8. The device of any of items 1-6, wherein the power source is an AC power source having a predetermined number of phases.
9. The device of item 8, wherein the predetermined number of phases is three phases.
10. The device of any of items 1-9, wherein the load is a direct current (DC) load.

11. The device of any of items 1-9, wherein the load is an AC load having a predetermined number of phases.
12. The device of item 11, wherein the predetermined number of phases is three phases.
13. The device of any of items 1-12, wherein the at least one reactive component of the series partially resonant circuit comprises a galvanic isolation device, wherein the series partially resonant circuit further comprises a first capacitive device connected in series to a first terminal of the galvanic isolation device and a second capacitive device connected in series to a second terminal of the galvanic isolation device, and wherein the series partially resonant circuit is formed by leakage inductance of the galvanic isolation device together with capacitance of the first capacitive device and the second capacitive device.
14. The device of any of items 1-13, wherein the plurality of bidirectional-conducting forward-blocking devices of the input stage are insulated-gate bipolar transistors with anti-parallel diodes.
15. The device of any of items 1-13, wherein the plurality of bidirectional-conducting forward-blocking devices of the input stage are controlled rectifiers with anti-parallel diodes.
16. The device of any of items 1-15, wherein the link stage is arranged in series between the input stage and the output stage.
17. The device of any of items 1-15, wherein the link stage is arranged in parallel between the input stage and the output stage.
18. The device of any of items 1-17, wherein the link stage comprises a film capacitor, a ceramic capacitor, or an electrolytic capacitor.
19. The device of any of items 1-18, further comprising one or more processors and memory, and machine-readable instructions stored in the memory that, upon execution by the one or more processors cause, and/or circuitry that causes the device to carry out operations comprising operating the device in a continuous conduction mode or a discontinuous conduction mode.
20. The device of item 19, further comprising operating the device at a fixed frequency.
21. The device of any of items 19-20, further comprising:
   charging the link stage from the power source in one or more consecutive input phases;
   discharging the link stage to the load in one or more consecutive output phases; and
   operating the device at a phase with no current passing the link stage and zero or constant voltage drop across the link stage.
22. The device of item 21, wherein:
   charging the link stage further comprises, for each input phase, charging the link stage until a voltage across an input phase pair of the power source reaches a reference voltage; and
   discharging the link stage further comprises, for each output phase except a last phase, discharging the link stage until a voltage across an output phase pair reaches a reference voltage, and for the last phase, discharging the link stage until a voltage across the link stage reaches zero.
23. The device of any of items 19-22, further comprising calculating a duty cycle of each of the bidirectional conducting devices, to regulate the current and voltage.
24. The device of any of items 1-18, further comprising one or more processors and memory, and machine-readable instructions stored in the memory that, upon execution by the one or more processors cause, and/or circuitry that causes the device to carry out operations comprising operating the device in a continuous conduction mode.
25. The device of item 24, further comprising operating the device at a variable frequency.
26. The device of any of items 24-25, further comprising:
   charging the link stage from the power source in one or more consecutive input phases; and
   discharging the link stage to the load in one or more consecutive output phases.
27. The device of item 26, wherein:
   charging the link stage further comprises, for each input phase, charging the link stage until a voltage across an input phase pair of the power source reaches a reference voltage; and
   discharging the link stage further comprises, for each output phase, discharging the link stage until a voltage across an output phase pair reaches a reference voltage.
28. The device of any of items 24-27, further comprising calculating a duty cycle of each of the bidirectional conducting devices, to regulate the current and voltage.
29. The device of any of items 1-18, further comprising one or more processors and memory, and machine-readable instructions stored in the memory that, upon execution by the one or more processors cause, and/or circuitry that causes the device to carry out operations comprising operating the device in a boundary of continuous conduction mode and discontinuous conduction mode.
30. The device of item 29, further comprising operating the device at a variable frequency.
31. The device of any of items 29-30, further comprising:
   charging the link stage from the power source in one or more consecutive input phases; and
   discharging the link stage to the load in one or more consecutive output phases.
32. The device of item 31, wherein:
   charging the link stage further comprises, for each input phase, charging the link stage until a voltage across an input phase pair of the power source reaches a reference voltage; and
   discharging the link stage further comprises, for output phases except a last phase, discharging the link stage until a voltage across an output phase pair reaches a reference voltage, and for the last phase, discharging the link stage until a voltage across the link stage reaches zero.
33. The device of any of items 29-32, further comprising calculating a duty cycle of each of the bidirectional conducting devices, to regulate the current and voltage.
34. A method of controlling a power conversion device, comprising:
   providing the power conversion device of any of items 1-23; and
   operating the device in a discontinuous conduction mode.
35. The method of item 34, further comprising operating the device at a fixed frequency.
36. The method of any of items 34-35, further comprising:
   charging the link stage from the power source in one or more consecutive input phases;
   discharging the link stage to the load in one or more consecutive output phases; and
   operating the device at a phase with no voltage drop across the link stage.
37. The method of item 36, wherein:
   charging the link stage further comprises, for each input phase, charging the link stage until a voltage across an input phase pair of the power source reaches a reference voltage; and
   discharging the link stage further comprises, for each output phase except a last phase, discharging the link stage until a voltage across an output phase pair reaches a reference voltage, and for the last phase, discharging the link stage until a voltage across the link stage reaches zero.

38. The method of any of items 34-37, further comprising calculating a duty cycle of each of the bidirectional conducting devices, to regulate the current and voltage.

39. A method of controlling a power conversion device, comprising:
   providing the power conversion device of any of items 1-18 and 24-28; and
   operating the device in a continuous conduction mode.

40. The method of item 39, further comprising operating the device at a variable frequency.

41. The method of any of items 39-40, further comprising:
   charging the link stage from the power source in one or more consecutive input phases; and
   discharging the link stage to the load in one or more consecutive output phases.

42. The method of item 41, wherein:
   charging the link stage further comprises, for each input phase, charging the link stage until a voltage across an input phase pair of the power source reaches a reference voltage; and
   discharging the link stage further comprises, for each output phase, discharging the link stage until a voltage across an output phase pair reaches a reference voltage.

43. The method of any of items 39-42, further comprising calculating a duty cycle of each of the bidirectional conducting devices, to regulate the current and voltage.

44. A method of controlling a power conversion device, comprising:
   providing the power conversion device of any of items 1-18 and 29-33; and
   operating the device in a boundary of continuous conduction mode and discontinuous conduction mode.

45. The method of item 44, further comprising operating the device at a variable frequency.

46. The method of any of items 44-45, further comprising:
   charging the link stage from the power source in one or more consecutive input phases; and
   discharging the link stage to the load in one or more consecutive output phases.

47. The method of item 46, wherein:
   charging the link stage further comprises, for each input phase, charging the link stage until a voltage across an input phase pair of the power source reaches a reference voltage; and
   discharging the link stage further comprises, for a first output phase, discharging the link stage until a voltage across an output phase pair reaches a reference voltage, and for a last phase, discharging the link stage until a voltage across the link stage reaches zero.

48. The method of any of items 44-47, further comprising calculating a duty cycle of each of the bidirectional conducting devices, to regulate the current and voltage.

DESCRIPTION OF THE DRAWINGS

The invention will be more fully understood from the following detailed description taken in conjunction with the accompanying drawings in which:

FIG. 22 illustrates example waveforms of the link voltage and link current of the three-phase AC-AC hard-switching power converter with a parallel or series capacitive link during operation, in accordance with one or more embodiments;

DETAILED DESCRIPTION OF THE INVENTION

I. Overview

Figure 1:
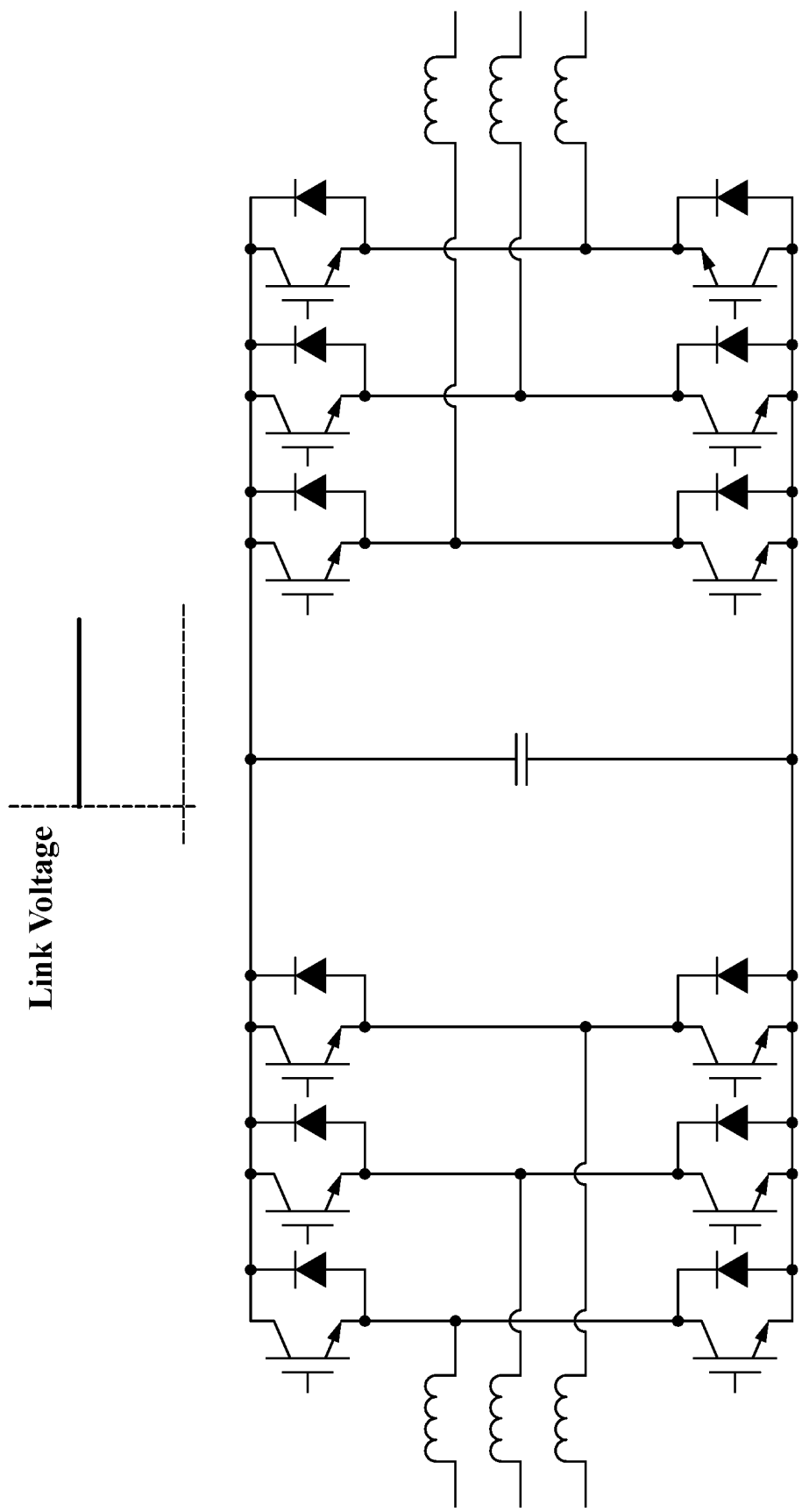
FIG. 1 illustrates a schematic of a typical three-phase DC-link AC-AC converter.

Universal power converters—devices that can convert between any of DC power, single-phase AC power, or poly-phase AC power—may be used in a wide variety of applications, including wind power generation systems, photovoltaic power generation systems, and electrical vehicle application, among others. Whatever the application may be, it is desired to have a power converter that is not only capable of converting between various power schemas, but also is reliable, inexpensive, small in size, and has a high power density. However, universal power converters typically require many switches; a traditional three-phase series partially resonant AC-link universal converter includes 24 switches (e.g. the power converter depicted in FIG. 2). While typical three-phase series partially resonant AC-link universal converters are capable of converting between a variety of power schemas, the large number of switches requires more heat-dissipating elements, such as heat sinks, which contribute considerably to the size of the power converter. Reducing the number of switches, therefore, would reduce the number of heat-dissipating elements, thereby reducing the overall size of the power converter. Additionally, if the amount of power output from the converter remains the same but the number of switches is reduced, the resulting power converter has a greater power density compared to the original topology.

Each switch used within a power converter may also have a failure rate characteristic. As the number of switches in a power converter increases, this failure rate is multiplied. Thus, it is desired to minimize the number of switches required, so as to reduce the overall failure rate of the power converter. A lower expected failure rate may increase the reliability of the power converter, thereby reducing maintenance frequency and the cost of operating the power converter over a period of time. Therefore, reducing the number of switches is desired, for at least the reason that the resulting power converter is smaller in size, reduced in weight, more reliable, lower cost, and has an increased power density.

Three-phase AC-AC converters are needed in a variety of applications, including wind power generation and variable speed drives. DC-link converters are the most common type of AC-AC converters. This type of converters is formed by a three-phase boost rectifier and a three-phase buck inverter. Regardless of the type of the rectifier or the inverter, DC electrolytic capacitors are integral part of these converters. Electrolytic capacitors have high failure rates and short lifetime. Therefore, converters that contain dc electrolytic capacitors have higher failure rates and shorter lifetimes compared to the other converters. Another limitation of the DC-link converters is the large size and the heavy weight of the low frequency transformers in applications that galvanic isolation is required. Three-phase inverters have similar shortcomings. Voltage Source Inverters (VSI) are usually cascaded with dc-dc converters, and they are decoupled through large electrolytic capacitors. In some applications three phase transformer are also added to the system.

FIG. 1 illustrates a schematic of a typical three-phase AC-AC converter. The DC-link converter depicted in FIG. 1 requires a high-capacitance capacitor. Such high-capacitance capacitors are typically electrolytic, which tend to be large in size and generally have a high rate of failure. Further, the capacitance of electrolytic capacitors tends to fluctuate with temperature, and high temperatures tend to cause these types of capacitors to fail.

Figure 2:
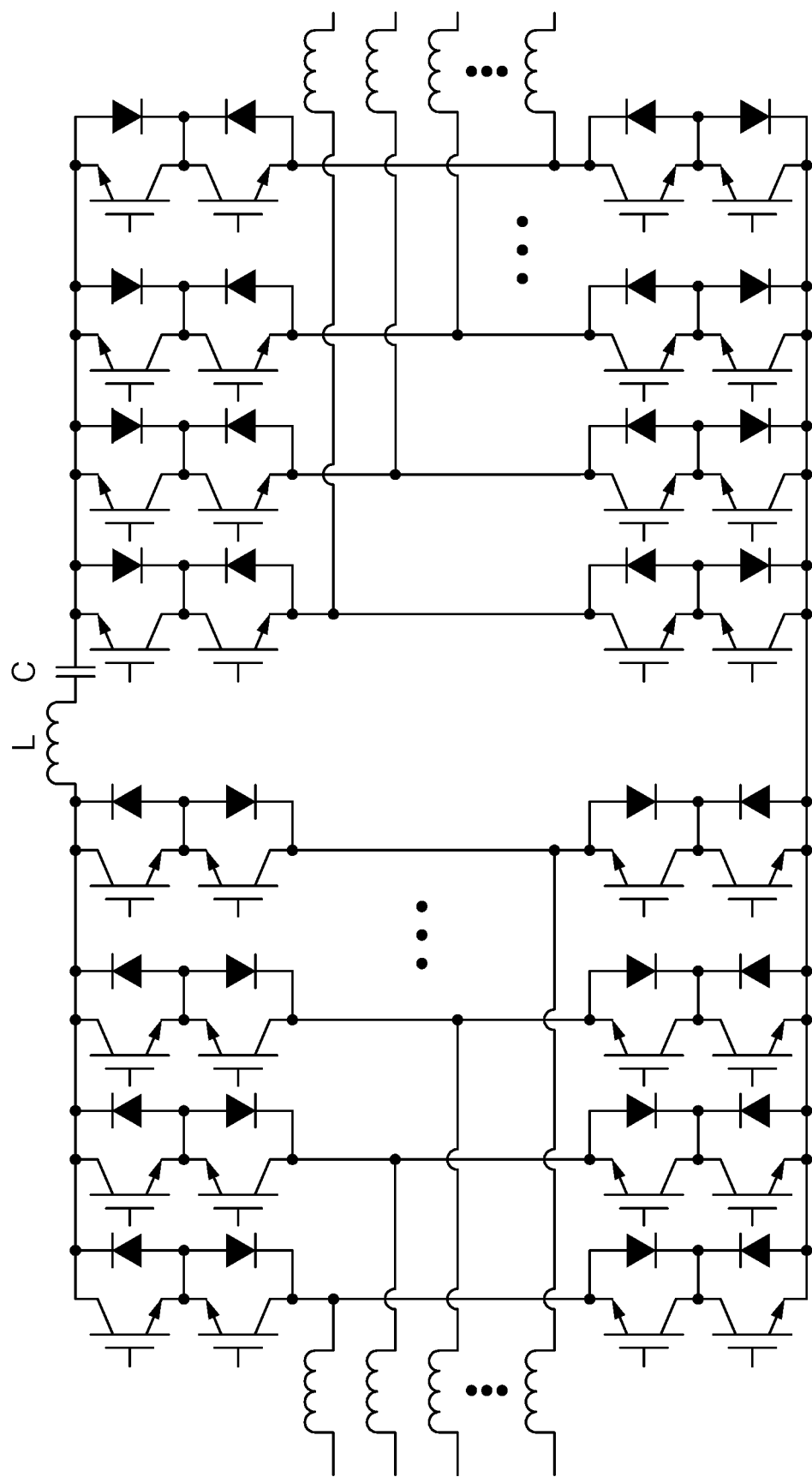
FIG. 2 illustrates a schematic of a three-phase ac-link power converter with a partially-resonant series AC-link.

FIG. 2 illustrates a schematic of a three-phase power converter with a partially-resonant series AC-link. While the AC-link in the converter depicted in FIG. 2 requires a lower capacitance—thus allowing for a smaller and more reliable capacitor—compared to the DC-link of the converter shown in FIG. 1, this converter requires a considerable number of switches (in this example, 24 switches). The large number of switches decreases the reliability of the converter's operation.

The following descriptions of the power converters shown in FIGS. 3-10, 11A-11I, 13-19, 20A-20D, 21A-21D may refer to devices that are "controllable" and "uncontrollable." A controllable device may be a device that can be controlled to act as a switch, such that the device conducts current when switched on and does not conduct current when switched off. In some cases, a controllable device may have three or more terminals, with one of the terminals corresponding to an input that may allow or prevent the flow of current through two other terminals. In some embodiments, controllable device may include a bipolar junction transistor or a field effect transistor, among other components. An uncontrollable device may be a device that, unlike a controllable device, does not include a terminal input that controls the flow of current through the device. In some cases, an uncontrollable device may have two or more terminals, with current flowing from one terminal through the other. An uncontrollable device may only conduct in one direction and prevent the flow of current in the opposite direction; this property of an uncontrollable device may be referred to herein as "reverse-blocking" of such a device. Such an uncontrollable device may start to conduct when a positive voltage is applied across it, and when it conducts the voltage across it remains zero. In some embodiments, the uncontrollable device may include a diode, among other components. Some uncontrollable devices may turn off when the current flowing through it becomes zero. It should be noted that a controllable device may also include an uncontrollable device, such that the device's conduction may be controllable in one direction and it is uncontrollable in another direction.

"Controlled rectifiers" may refer herein to devices that operate in two states: off and on. In the off state, controlled rectifiers may act as forward-blocking and reverse-blocking (i.e. bidirectional-blocking) devices. In the on state, controlled rectifiers may act as a forward-conducting and reverse-blocking device. Example controlled rectifiers include silicon-controlled rectifiers (SCRs) and thyristors, among other possible controlled rectifiers. Some types of controlled rectifiers may have natural commutation, where the turn-on of these devices is controllable and the turn-off is not. Such controlled rectifiers may be turned off when their current becomes zero.

II. Soft-Switching Power Converters a. Overview

The soft-switching power converters shown in FIGS. 3-10 each provide significant benefits over traditional universal power converters. The power converters illustrated in FIGS. 3-10 are configured to perform soft-switching. During operation, the series resonant link charges, and then begins to resonate. As power transfers between the inductor (or other device that acts an inductor) and the capacitor (or other device that acts as a capacitor), the switches may be turned off at appropriate points in time such that no current conducts through the switch at the point of turn-off. The switches may also be turned on such that the current gradually increases at the turn-on transition. This zero-current soft-switching decreases the power losses typically associated with the turning on and off of a transistor (e.g. an insulated-gate bipolar transistor, or IGBT) or other switching device. The timing of the activating and deactivating of various switches is depicted in FIGS. 11A-11I.

In addition to the zero-current soft-switching benefits, the various topologies of power converters illustrated in FIGS. 3-10 each provide additional benefits that may be desired under various circumstances. These topologies may be modified for a variety of source and load configurations, including DC-DC, DC-AC, AC-DC, and AC-AC (with a given AC being any number of phases). Because the switching losses are minimized or otherwise reduced, the switching frequency of the power converter can be increased; therefore the link capacitance may be small. The LC link resonates during the switch transition, and since the LC-link is configured to resonate at a relatively high frequency (compared to the AC power frequency), the inductor and capacitor in the series LC-link may be small and reliable; thus, unlike typical power converters, bulky and unreliable electrolytic capacitors may be eliminated from these topologies.

Additionally, galvanic isolation may be provided between the input stage and the output stage of these converters to make the power converter safer to operate. In some power conversion applications, galvanic isolation may be desired to prevent dangerous current flow through the power converter in the event of a failure of a reactive component in the AC-link. In some instances, the power converter may be providing many kilowatts of power, and the galvanic isolation may be included to prevent power shorts that may damage the power source and/or load.

Certain soft-switching power converter topologies discussed herein may implement controlled rectifiers with natural commutation, such as silicon-controlled rectifiers (SCRs) or thyristors, instead of traditional transistor switches (such as IGBTs or field effect transistors (FETs)). The controlled rectifiers may be more reliable than transistor switches. Additionally, controlled rectifiers, unlike transistor switches, do not need to be turned off and have a natural commutation; thus, control circuits that control power converters that implement controlled rectifiers may be simplified.

b. Example Configurations

In the following configurations, each of the switches S0-S12 may be any type of controllable switching device, such as an IGBT or FET. The diodes may be any type of forward-conducting reverse-blocking device. In addition, the inductor L may be any device that acts an inductor or has inductance (e.g. an air core inductor, a ferromagnetic core inductor, and/or parasitic inductance from a device). The capacitor C may be any device that acts as a capacitor or has capacitance (e.g. film capacitors, ceramic capacitors, electrolytic capacitors, and/or parasitic capacitance from a device).

Figure 3:
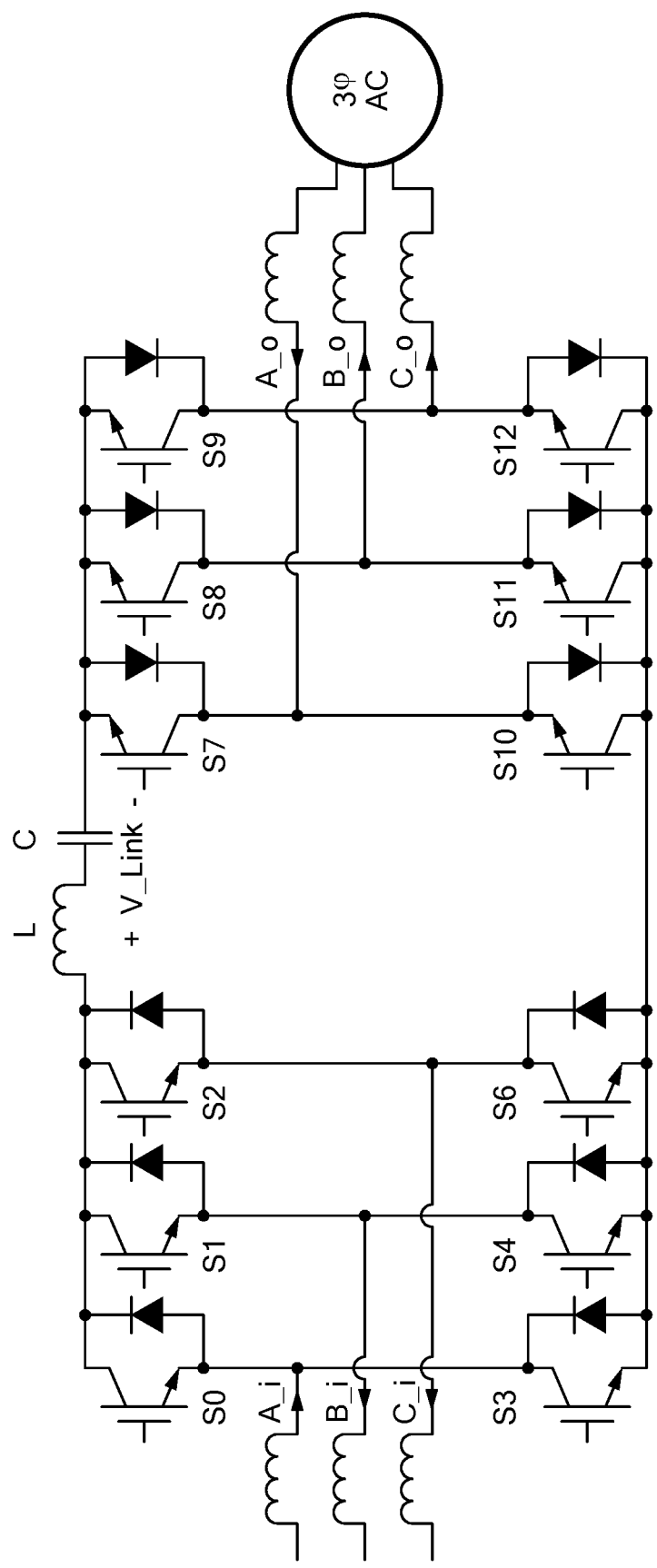
FIG. 3 illustrates a schematic of a three-phase AC-AC soft-switching power converter with a series partially resonant link, in accordance with one or more embodiments.

FIG. 3 illustrates a schematic of a three-phase AC-AC soft-switching power converter with a series partially resonant link, in accordance with one or more embodiments. As shown in FIG. 3, the three-phase AC-AC soft-switching power converter with a series resonant link includes 12 switches (S0-S4 and S6-S12) and 12 diodes in parallel with those switches. The series partially resonant link includes an inductor L and a capacitor C, which during operation facilitates zero current switching. The series partially resonant link is configured to resonate at a higher frequency than the frequency of the power source.

Figure 4:
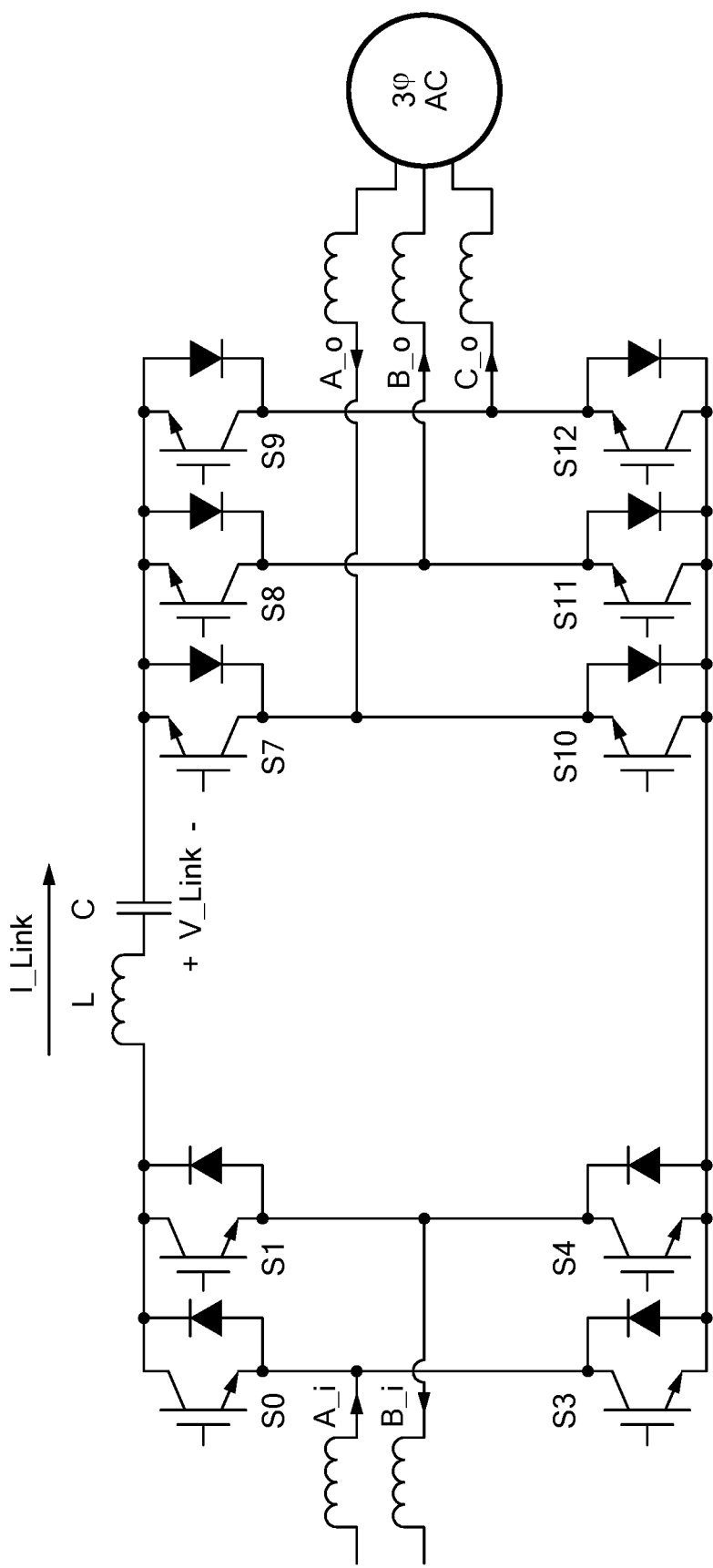
FIG. 4 illustrates a schematic of a DC to three-phase AC soft-switching power converter with a series partially resonant link, in accordance with one or more embodiments.

FIG. 4 illustrates a schematic of a DC to three-phase AC soft-switching power converter with a series partially resonant link, in accordance with one or more embodiments. As shown in FIG. 4, the DC to three-phase AC soft-switching power converter with a series partially resonant link includes 10 switches (S0-S4 and S7-S12) and 10 diodes in parallel with those switches. The series partially resonant link includes an inductor L and a capacitor C, which during operation facilitates zero current switching. The link capacitor may also transfer power from input to the output. The series partially resonant link is configured to operate at a higher frequency than the frequency of the power source.

Figure 5:
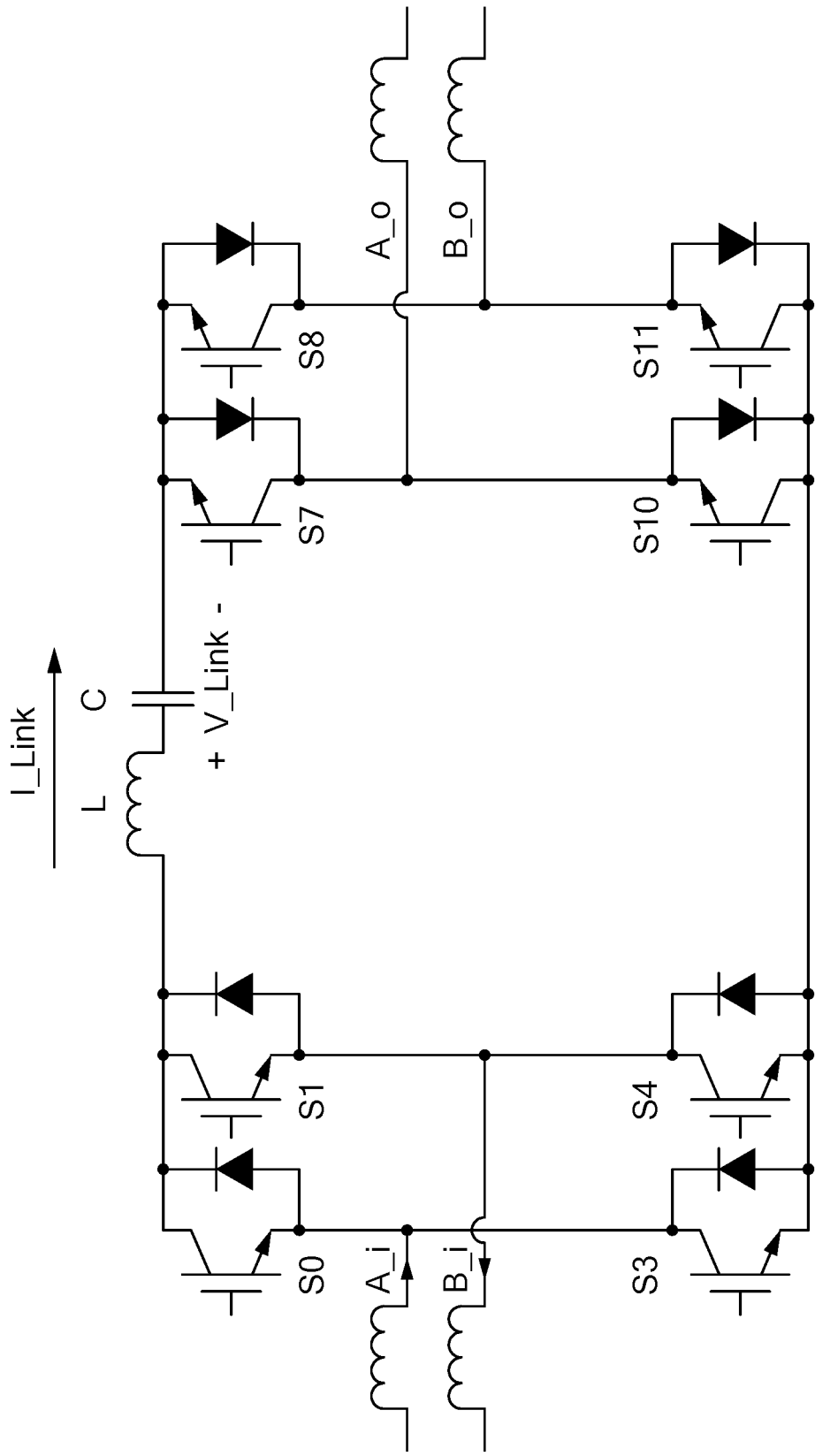
FIG. 5 illustrates a schematic of a DC-DC soft-switching power converter with a series partially resonant link, in accordance with one or more embodiments.

FIG. 5 illustrates a schematic of a DC-DC soft-switching power converter with a series partially resonant link, in accordance with one or more embodiments. As shown in FIG. 5, the DC-DC soft-switching power converter with a series partially resonant link includes 8 switches (S0, S1, S3, S4, S7, S8, S10, and S11) and 8 diodes in parallel with those switches. The series partially resonant link includes an inductor L and a capacitor C, which during operation facilitates zero current switching. The link capacitor may also transfer power from input to the output. The series partially resonant link is configured to operate at a higher frequency than the frequency of the power source.

Figure 6:
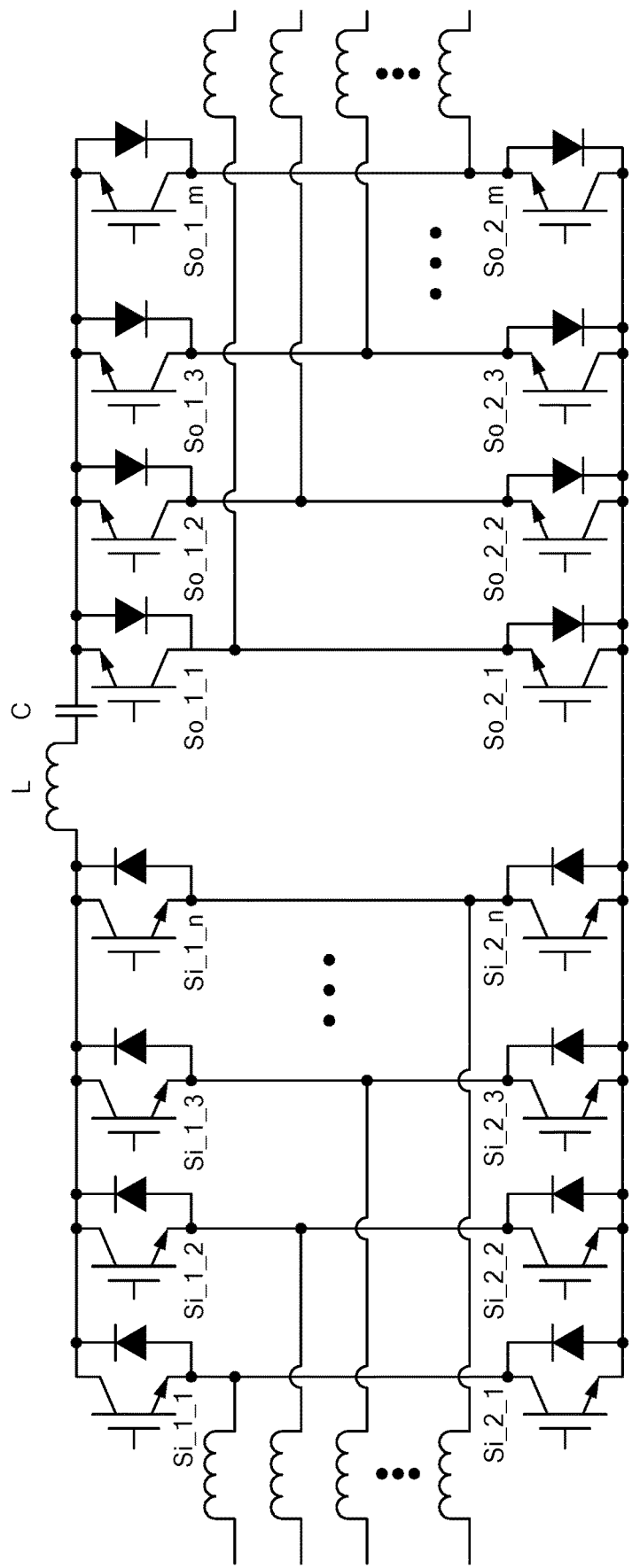
FIG. 6 illustrates a schematic of a poly-phase AC-AC soft-switching power converter with a series partially resonant link, in accordance with one or more embodiments.

FIG. 6 illustrates a schematic of a poly-phase AC-AC soft-switching power converter with a series partially resonant link, in accordance with one or more embodiments. The poly-phase AC-AC soft-switching power converter with a series partially resonant link may include any number of phases at the input side and any number of phases at the output side. The switch and diode configuration of the poly-phase AC-AC soft-switching power converter with a series partially resonant link may be similar to the switch and diode configuration of the three-phase AC-AC soft-switching power converter with a series partially resonant link depicted in FIG. 3. The series partially resonant link includes an inductor L and a capacitor C, which during operation facilitates zero current switching. The link capacitor may also transfer power from input to the output. The series partially resonant link is configured to operate at a higher frequency than the frequency of the power source.

Figure 7:
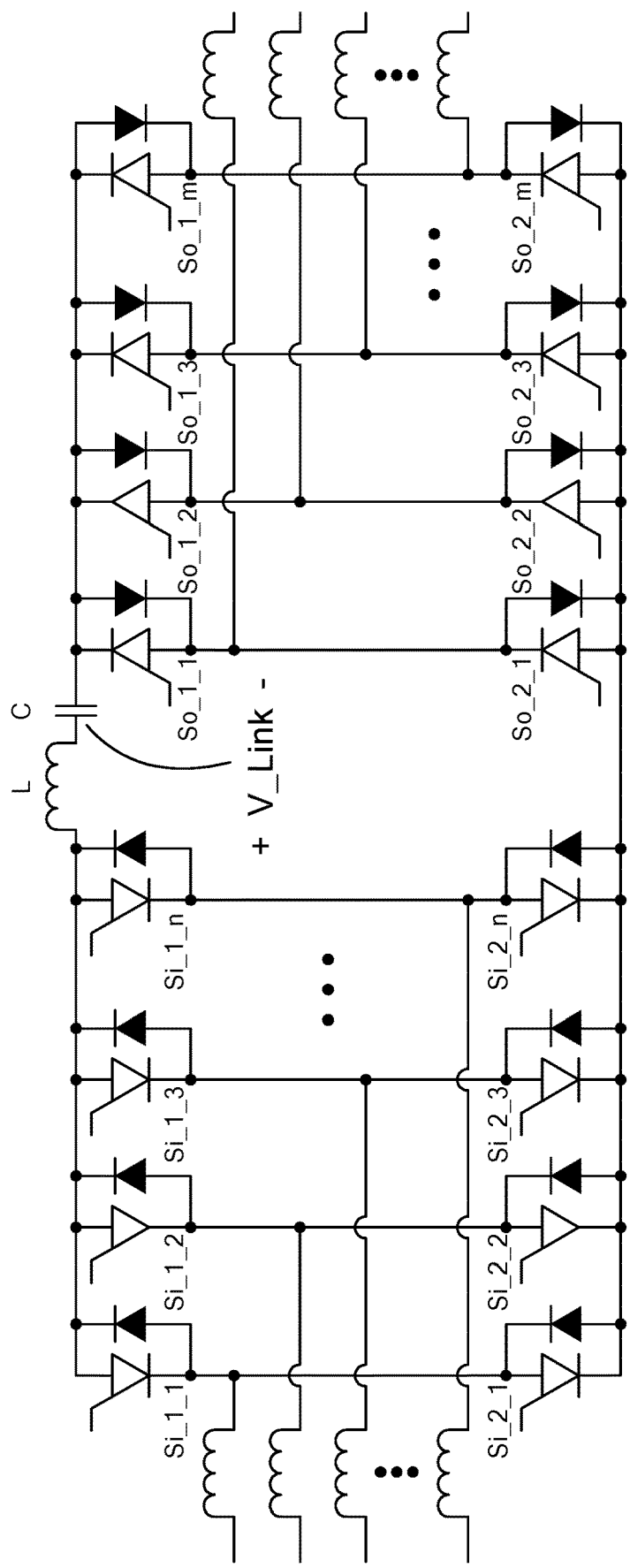
FIG. 7 illustrates a schematic of a poly-phase AC-AC soft-switching power converter utilizing controlled rectifiers with a series partially resonant link, in accordance with one or more embodiments.

FIG. 7 illustrates a schematic of a poly-phase AC-AC soft-switching power converter utilizing controlled rectifiers with a series partially resonant link, in accordance with one or more embodiments. The poly-phase AC-AC soft-switching power converter utilizing controlled rectifiers with a series partially resonant link may be similar to the poly-phase AC-AC soft-switching power converter with a series partially resonant link depicted in FIG. 6, where the switches are replaced with controlled rectifiers. The controlled rectifiers may be SCRs or thyristors. The series partially resonant link includes an inductor L and a capacitor C, which during operation facilitates zero current switching. The link capacitor may also transfer power from input to the output. The series partially resonant link is configured to operate at a higher frequency than the frequency of the power source.

Figure 8:
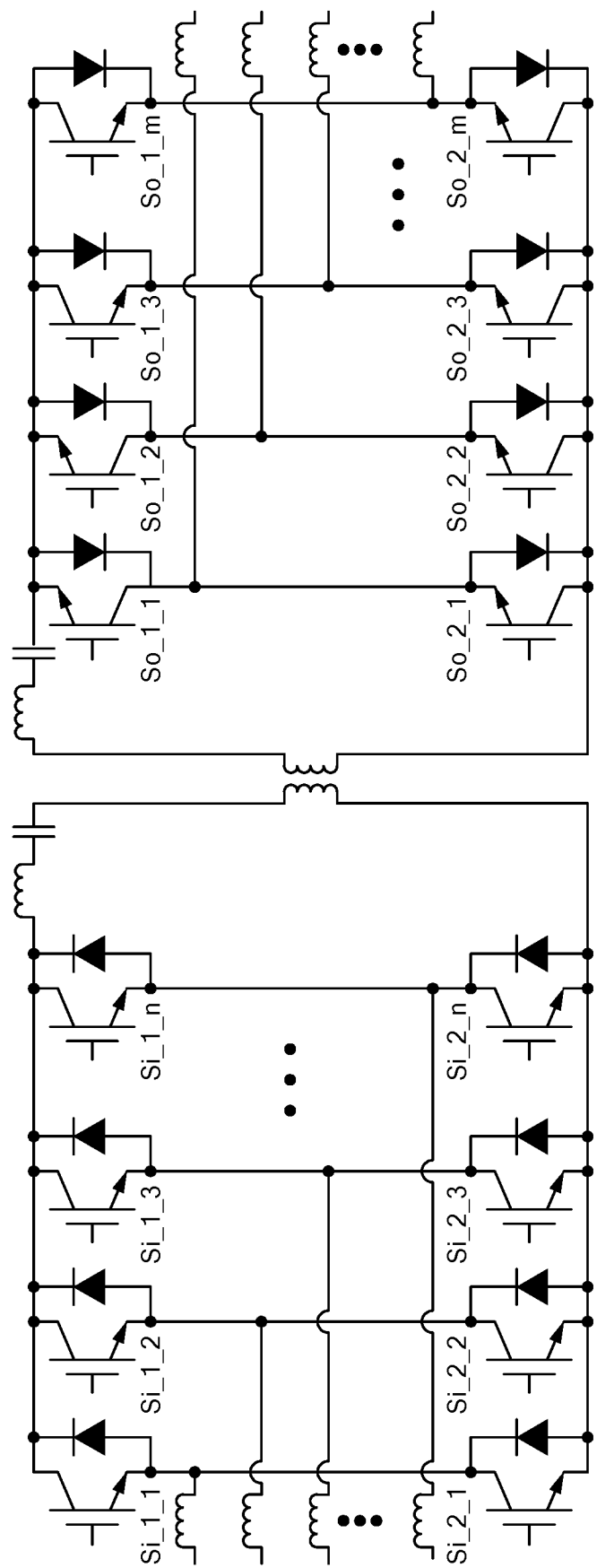
FIG. 8 illustrates a schematic of a poly-phase AC-AC soft-switching power converter with a series partially resonant link and galvanic isolation, in accordance with one or more embodiments.

FIG. 8 illustrates a schematic of a poly-phase AC-AC soft-switching power converter with a series partially resonant link and galvanic isolation, in accordance with one or more embodiments. The poly-phase AC-AC soft-switching power converter with a series partially resonant link and galvanic isolation may be similar to the poly-phase AC-AC soft-switching power converter with a series partially resonant link depicted in FIG. 6, with added galvanic isolation between the input side and the output side. As shown in FIG. 8, the poly-phase AC-AC soft-switching power converter with a series partially resonant link and galvanic isolation may include series LC links on both sides of the galvanic isolation. The galvanic isolation may be provided using a high-frequency transformer or an opto-isolator, among other forms of galvanic isolation.

Figure 9:
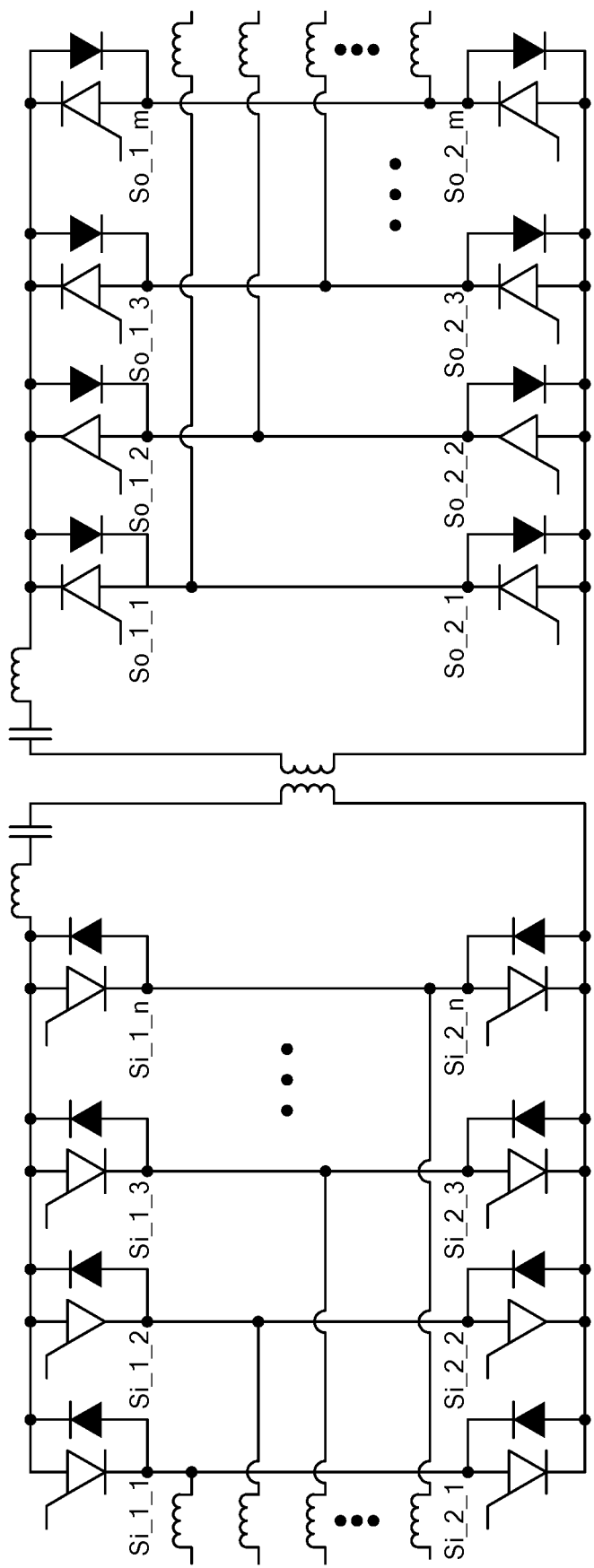
FIG. 9 illustrates a schematic of a poly-phase AC-AC soft-switching power converter utilizing controlled rectifiers with a series partially resonant link and galvanic isolation, in accordance with one or more embodiments.

FIG. 9 illustrates a schematic of a poly-phase AC-AC soft-switching power converter utilizing controlled rectifiers with a series partially resonant link and galvanic isolation, in accordance with one or more embodiments. The poly-phase AC-AC soft-switching power converter utilizing controlled rectifiers with a series partially resonant link and galvanic isolation may be similar to the poly-phase AC-AC soft-switching power converter with a series partially resonant link and galvanic isolation depicted in FIG. 8, where the switches are replaced with controlled rectifiers. The controlled rectifiers may be SCRs or thyristors. The series partially resonant link includes an inductor L and a capacitor C, which during operation facilitates zero current switching. The link capacitor may also transfer power from input to the output. The series partially resonant link is configured to operate at a higher frequency than the frequency of the power source.

Figure 10:
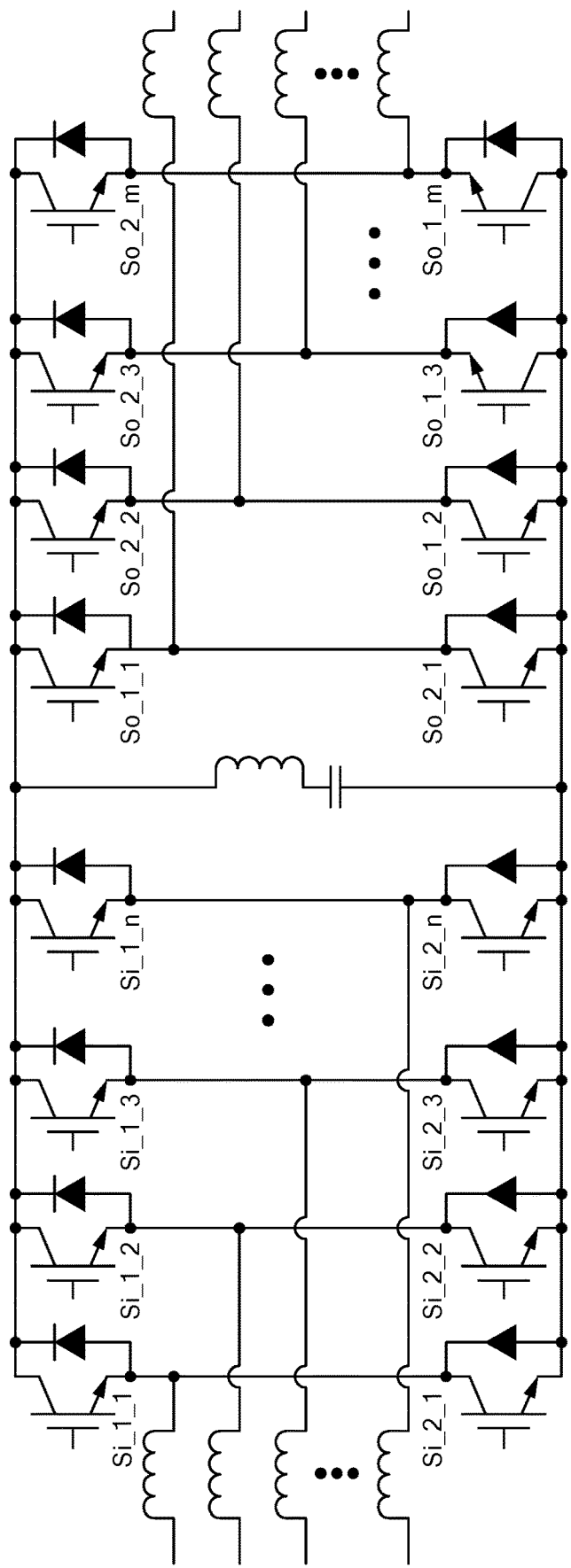
FIG. 10 illustrates a schematic of a poly-phase AC-AC soft-switching power converter with a series partial resonant link in parallel with an input stage and an output stage, in accordance with one or more embodiments.

FIG. 10 illustrates a schematic of a poly-phase AC-AC soft-switching power converter with a series partial resonant link placed in parallel with input and output stages, in accordance with one or more embodiments. The poly-phase AC-AC soft-switching power converter with a series partially resonant link may include an input side connected to a power source, an output side connected to a load, and a series LC link that is connected in parallel between the input side and the output side. The series resonant link includes an inductor L and a capacitor C, which during operation facilitates zero current switching. The link capacitor may also transfer power from input to the output. The series partially resonant link is configured to operate at a higher frequency than the frequency of the power source.

c. Example Modes of Operation

FIGS. 11A-11I illustrates example modes of operation of the three-phase AC-AC soft-switching power converter with a series resonant link, in accordance with one or more embodiments. The three-phase AC-AC soft-switching power converter with a series resonant link utilizes 8 modes of operation to facilitate the desired power conversion. The modes of operation include charging the link, resonating the link, and discharging the link.

Figure 27:
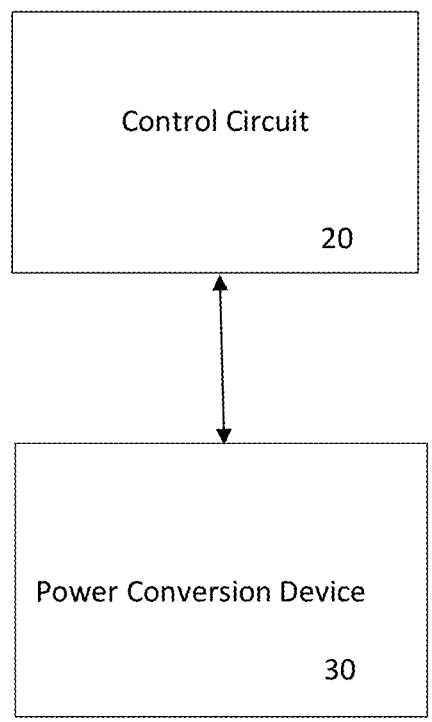
FIG. 27 is a schematic illustration of a control circuit in communication with a power conversion device.

In some embodiments, a control circuit 20 (shown schematically in communication with power conversion device 30 in FIG. 27) is used to facilitate the switching of the input-side crossover switching circuit switches and the output switching bridge switches. The control circuit may be, for example, a microcontroller, an FPGA, or an analog circuit, among others. In some instances, the control circuit facilitates soft switching. For example, switch S2 is turned on to initiate the resonating mode 2. The control circuit may monitor the voltage across one or more components of the power converter and trigger the turning on and off of various switches during operation. By activating certain switches, a short circuit may be made that causes the link to resonate. Power losses typically associated with switching may be greatly reduced using such a soft-switching technique.

Each cycle is divided into 8 modes, with 4 power transfer modes and 4 resonating modes taking place alternately. The link may be energized from various phases of the power source during modes 1 and 3 and de-energized to the output load during modes 5 and 7. Modes 2, 4, 6, and 8 are resonating modes that facilitate zero current switching. Each of the 8 modes is described in more detail below with respect to the three-phase AC-AC soft-switching power converter with a series partially resonant link depicted in FIG. 3. The voltage across phase pair AB at the input side may be the maximum input line-to-line voltage, and may be is positive. The voltage across the output phase pair AB may be the maximum output line-to-line voltage and may be is negative. In general, the phase pairs carrying the maximum line-to-line input and output voltages do not necessarily need to be the same. Moreover, the phase pairs carrying the maximum line-to-line voltages may change over a cycle.

Figure 11A:
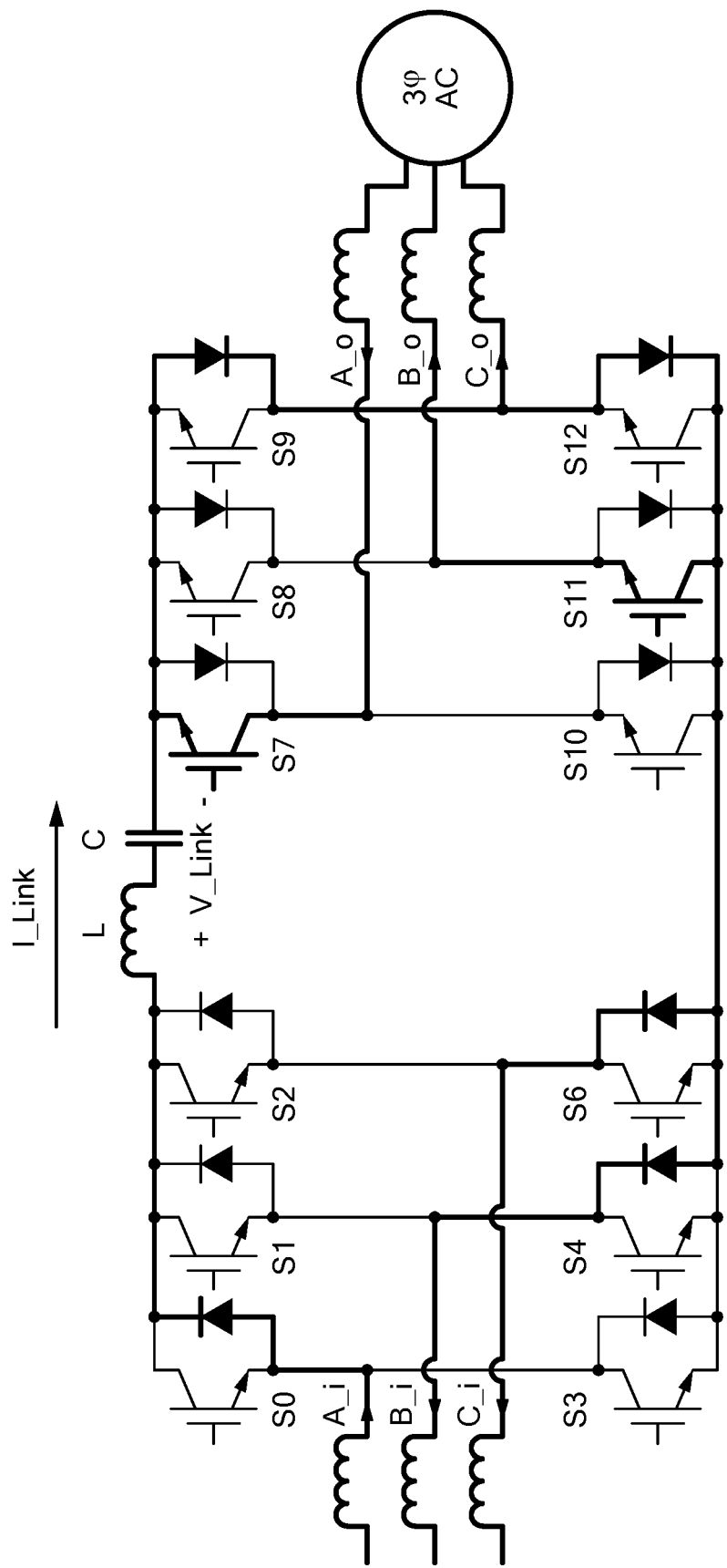
FIGS. 11A-11I illustrate example modes of operation of the three-phase AC-AC soft-switching power converter with a series partially resonant link, in accordance with one or more embodiments.

FIG. 11A: Mode 1 (Charging)

During mode 1, input phases conduct through the diodes connected in parallel with switches S0, S4, and S6 into the series link. In mode 1, the link current ($I_{link}$) is the current flowing through input-side phase A ($I_{A\_i}$). This is accomplished by turning on switches S7 and S11. These switches may be selected according the output voltage references. As the link current flows into the capacitor C, the capacitor C charges up, thus allowing current to flow through it and increasing the voltage across it. Since the switching frequency is much higher than the frequencies of the input and output currents, during each charging or discharging mode, the input and output currents are almost constant. Therefore, during the charging and discharging modes the link inductor may act as a short circuit. Once the average of the voltage across the input phase pair AC is equal to a reference voltage, switch S2 is turned on to initiate mode 2. This effectively "short circuits" the inductor L and the capacitor C to allow the LC link to resonate.

Figure 11B:
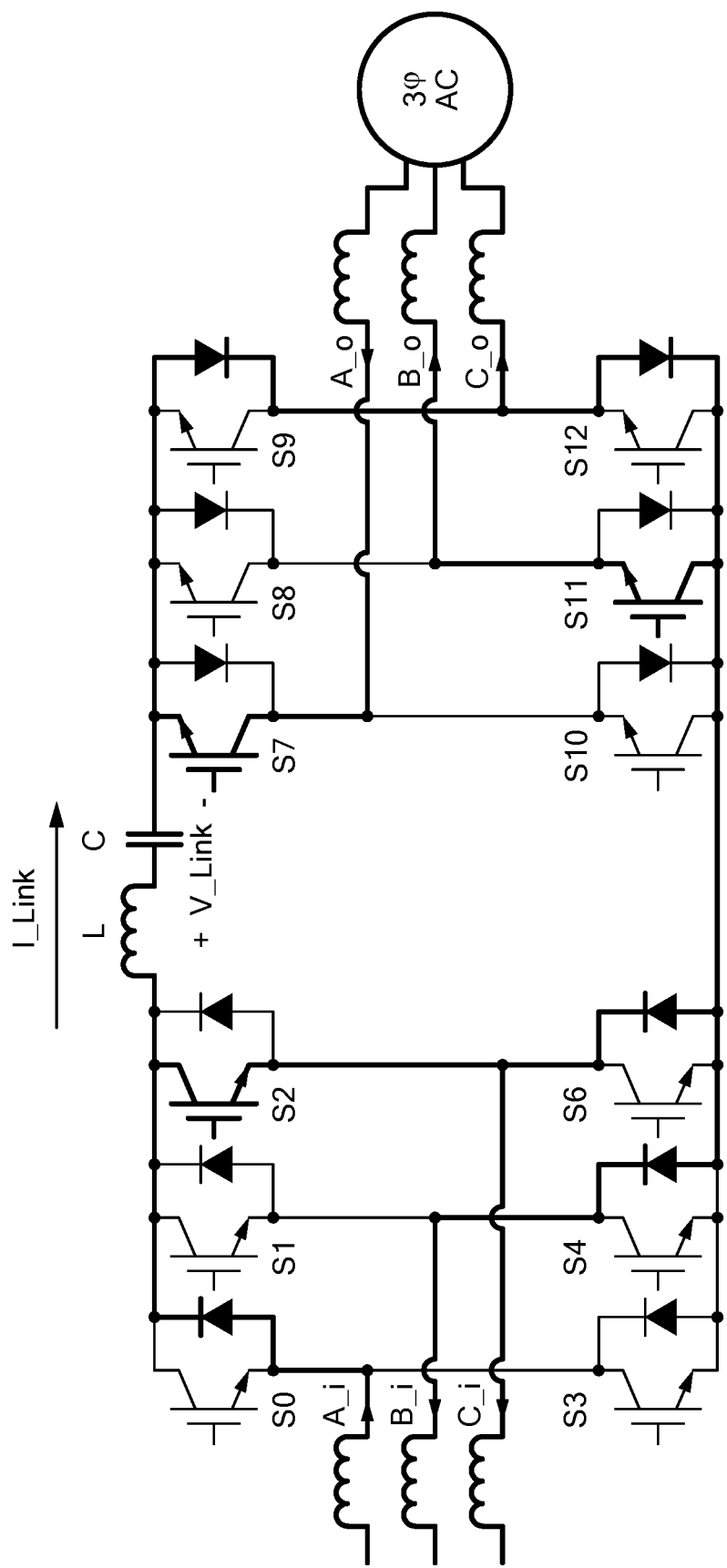

FIG. 11B: Mode 2 (Resonating)

During mode 2, the link begins to resonate to allow for zero-current switching. Once the link current ($I_{link}$) becomes equal to the input-side current of phase B ($I_{B\_i}$), the diode in parallel with switch S6 turns off and stops conducting. At this moment, the current flowing through the diode in parallel with switch S6 is equal to zero.

Figure 11C:
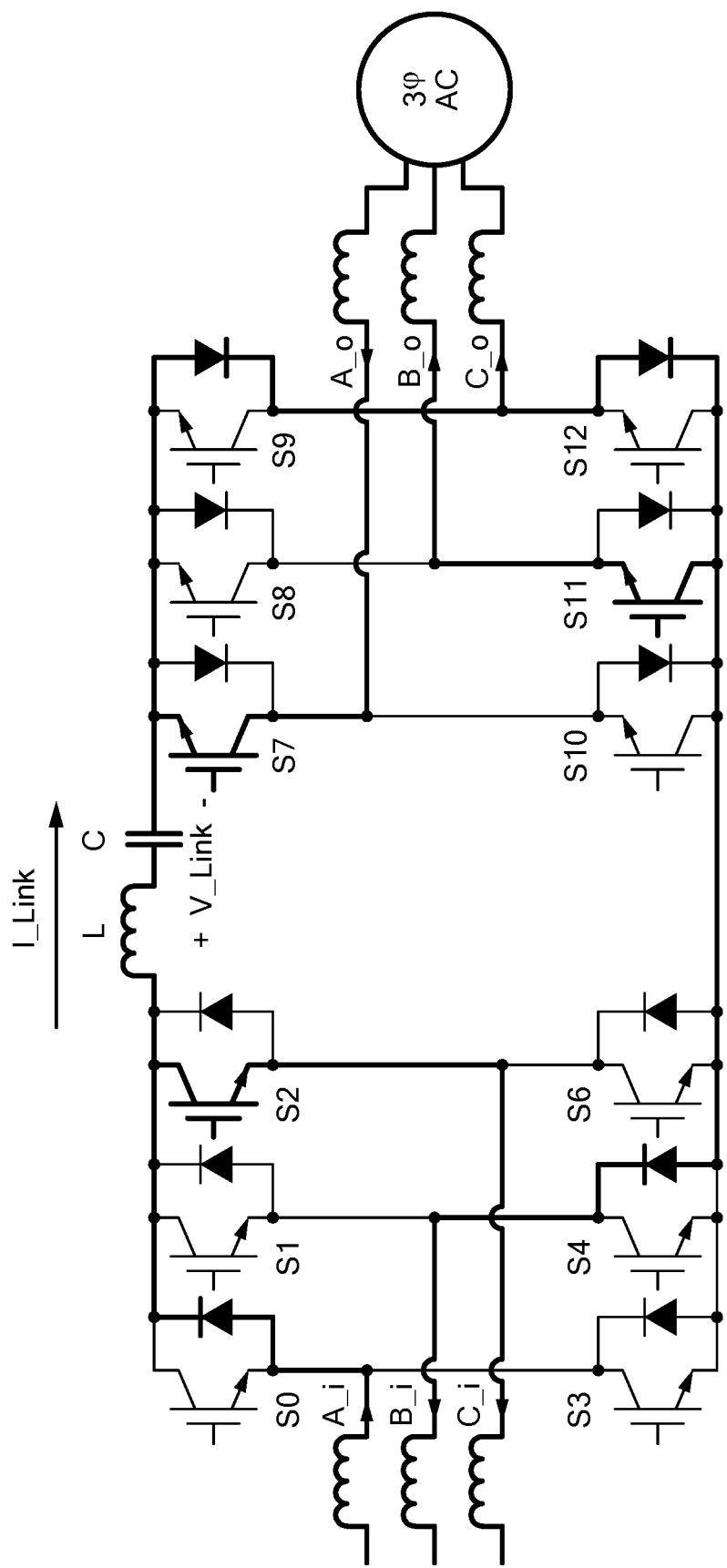

FIG. 11C: Mode 3 (Charging)

During mode 3, phase B charges the link capacitor. Once the average of the voltage across input-side phase-pair AB meets a reference voltage, switch S6 is turned on to begin resonating mode 4.

Figure 11D:
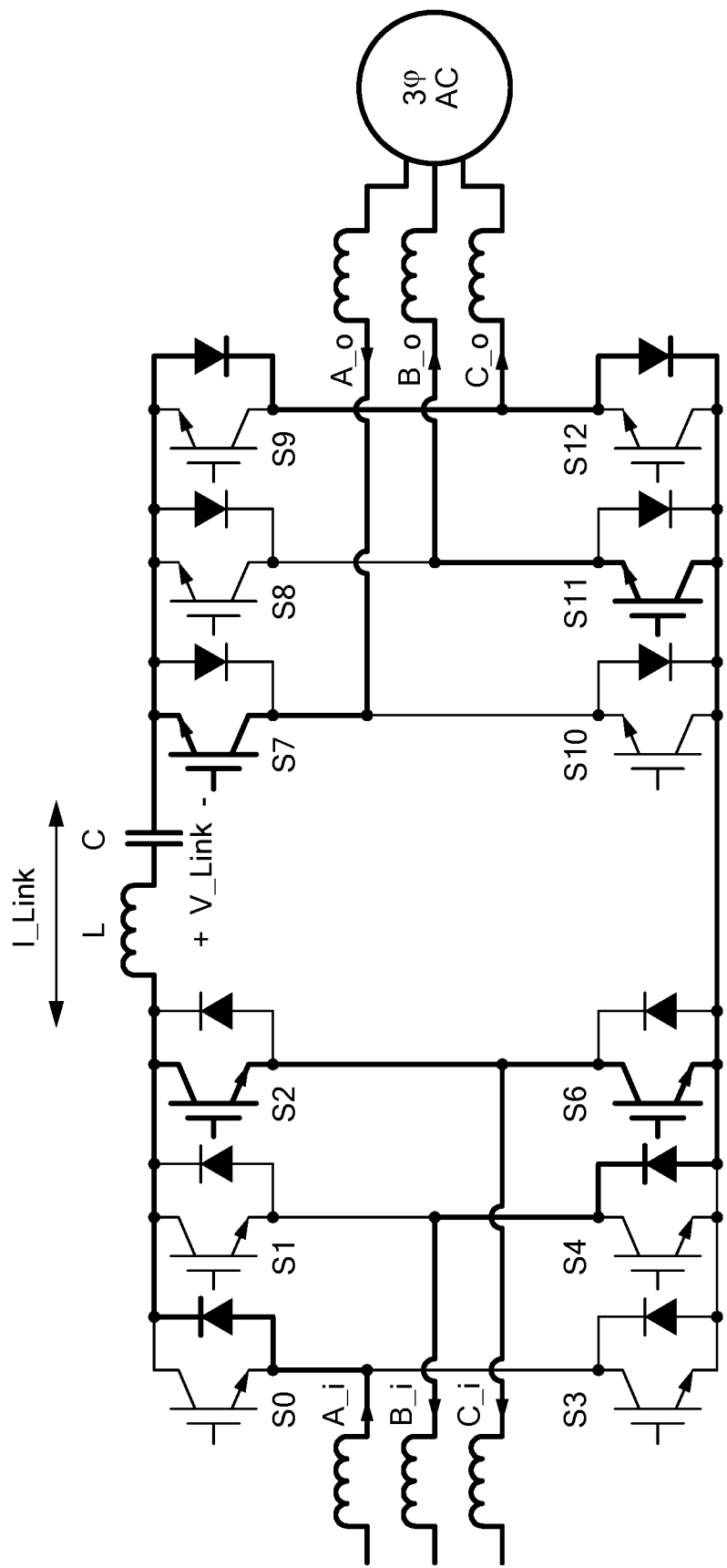

FIG. 11D: Mode 4 (Resonating)

During mode 4, the link is shorted by turning on switch S6, which causes the link to resonate. As a result, the link current begins to decrease and causes the link current to reverse. Once the absolute value of the link current ($IL_{O,k}$) becomes equal to the absolute value of the output-side phase B current ($I_{B\_o}$), the diode in parallel with switch S12 stops conducting to start mode 5. At this point, the output-side current at phase A is equal to the sum of the output-side currents at phase B and phase C ($I_{A\_o} = I_{B\_o} + I_{C\_o}$).

Figure 11E:
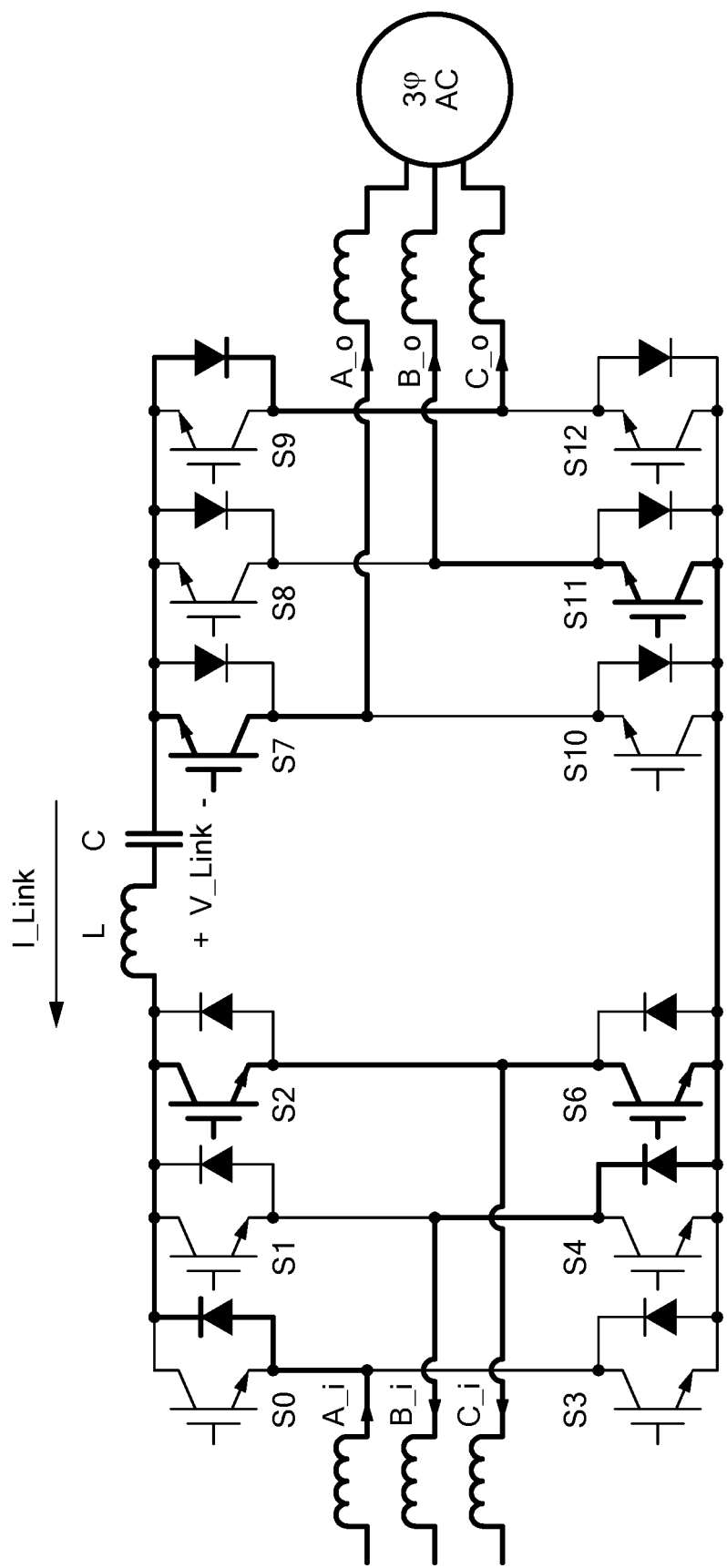

FIG. 11E: Mode 5 (Discharging)

During mode 5, the link current ($I_{link}$), which is negative, is equal to the output-side current of phase B ($I_{B\_o}$). Thus, link voltage decreases, causing the link capacitor to discharge into the output. When the voltage across the output-side phase-pair BC becomes equal to a reference voltage, resonating mode 6 begins by turning on S12.

Figure 11F:
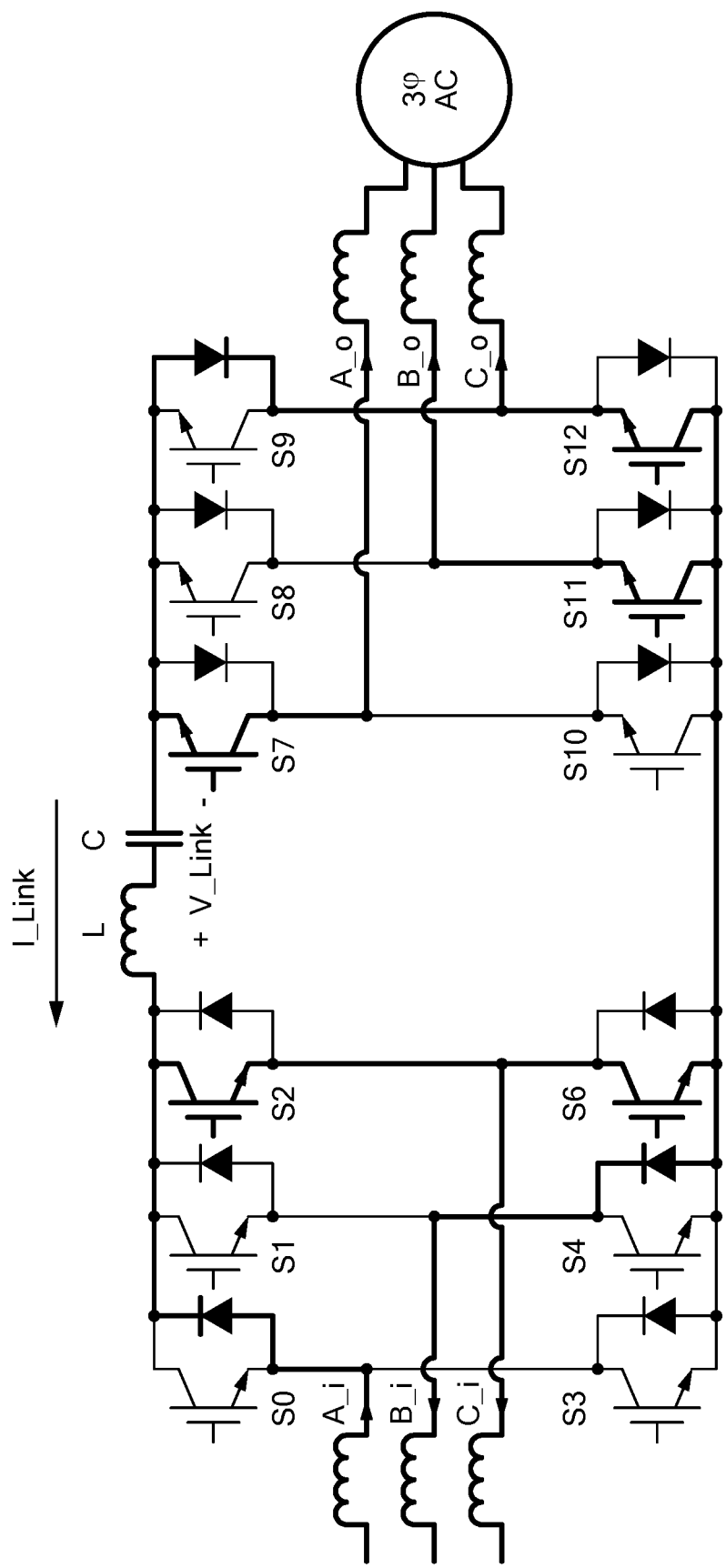

FIG. 11F: Mode 6 (Resonating)

During mode 6, switch S12 is turned on to short the LC link, thus allowing it to resonate. The link current ($I_{link}$) decreases until the absolute value of the link current is equal to the absolute value of the output-side current at phase A ($I_{A\_o}$). At this moment, the diode in parallel with S9 stops conducting (which is conducting zero current) and mode 7 begins.

Figure 11G:
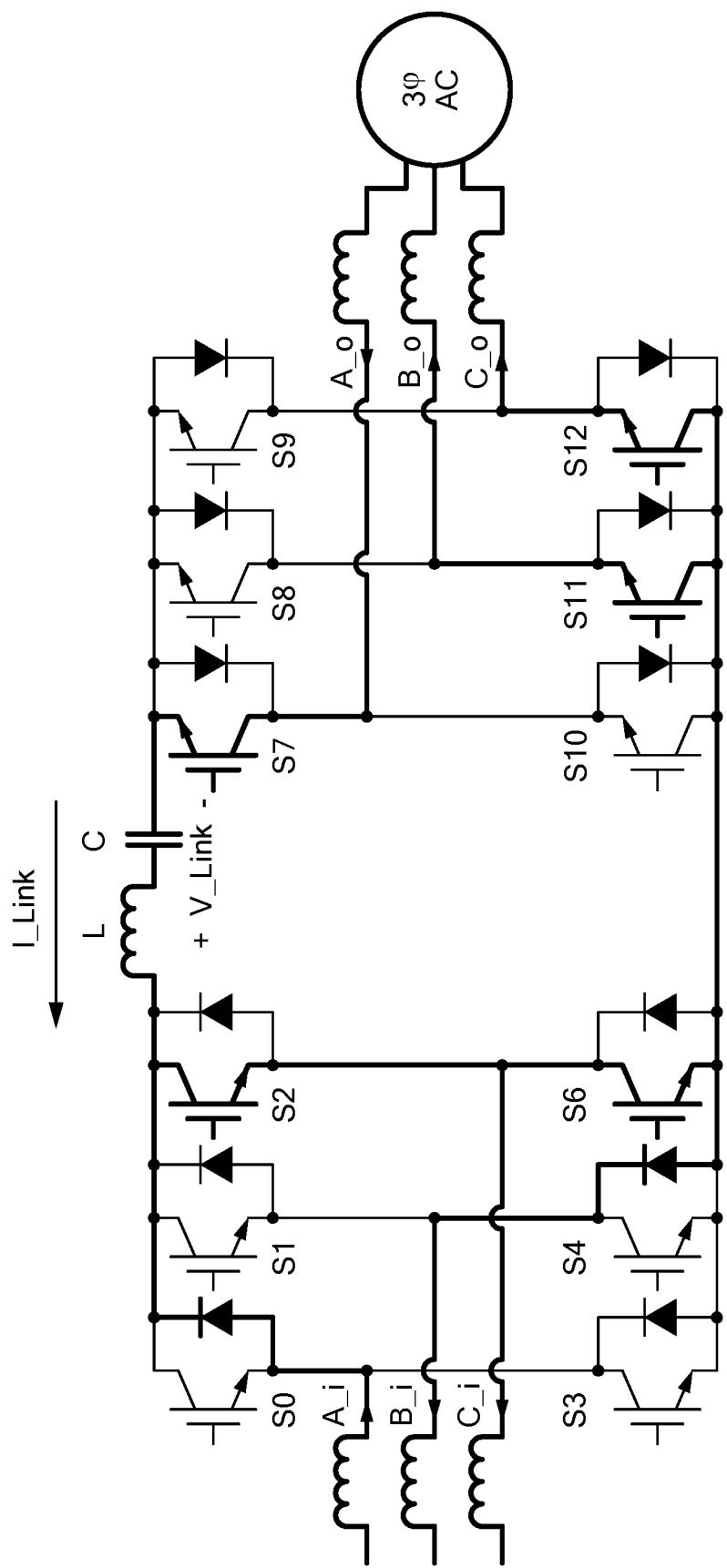

FIG. 11G: Mode 7 (Discharging)

During mode 7, the energy stored in the capacitor C discharges into the output. The link current ($I_{link}$) during mode 7 is equal to the output-side current of phase A ($I_{A\_o}$). When the energy stored in the link is sufficient for the link current to reach a predetermined value (which may be a higher value than the peak of the input and output currents), mode 8 begins by turning on switch S9.

Figure 11H:
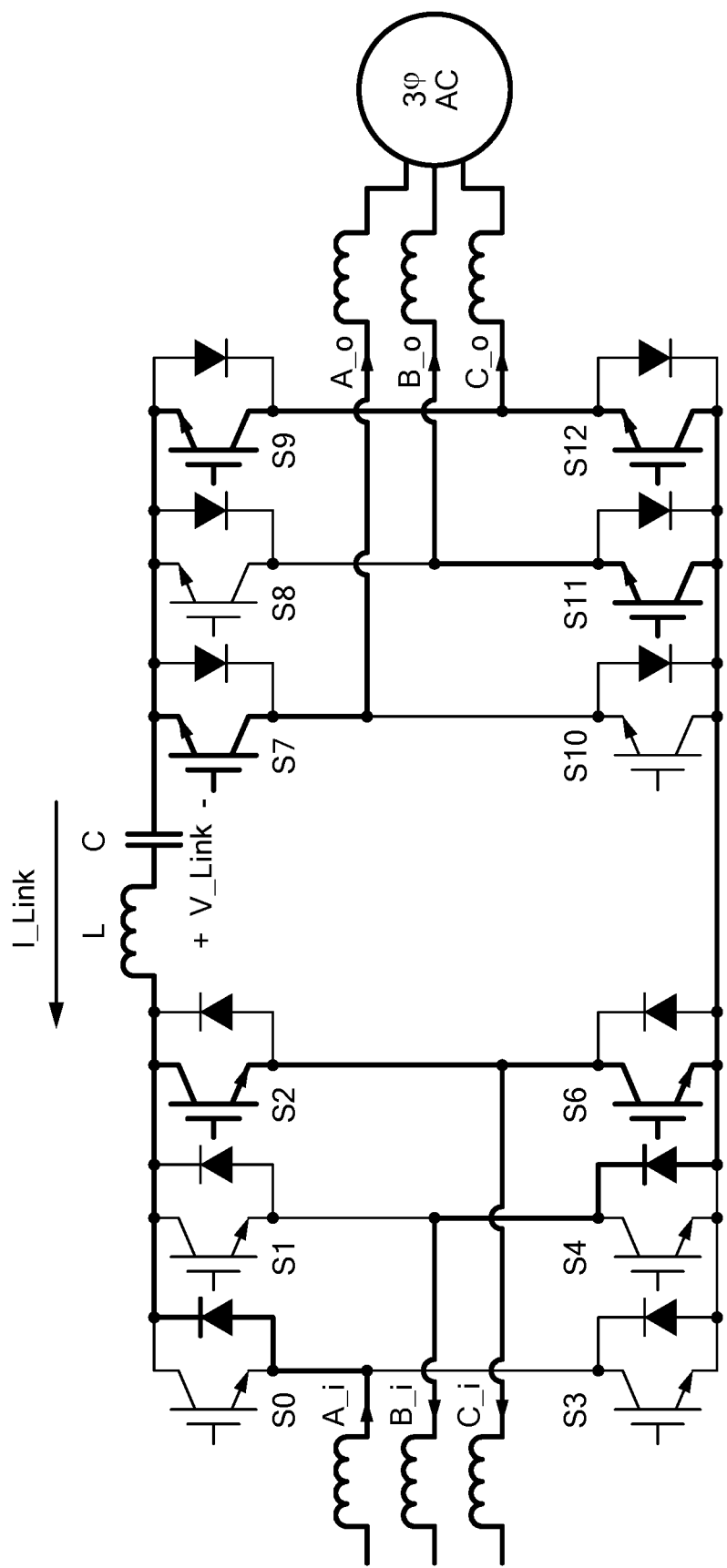

FIG. 11H: Mode 8; Part 1 (Resonating)

During mode 8, part 1, the link resonates until the voltage across it ($V_{Link}$) becomes zero. At this moment, the diodes in parallel with switch S9 and switch S12 become forward biased and begin conducting. This marks the beginning of mode 8, part 2.

Figure 11I:
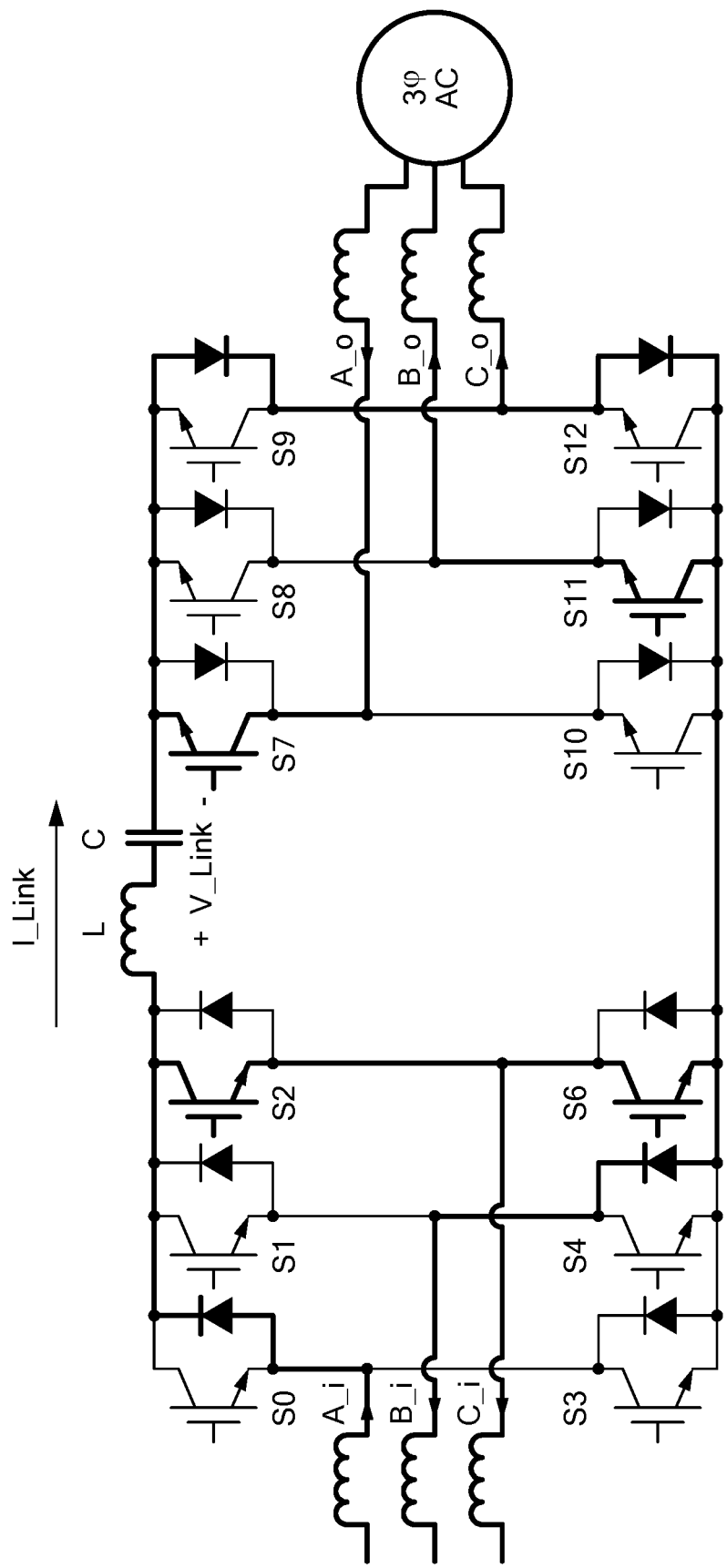

FIG. 11I: Mode 8; Part 2 (Resonating)

During mode 8, part 2, the link current ($I_{link}$) begins increasing until it becomes equal to the input-side current of phase A ($I_{A\_i}$). At this moment, the modes of operation may be repeated starting again at mode 1.

d. Example Link Voltage and Current Waveforms

Figure 12:
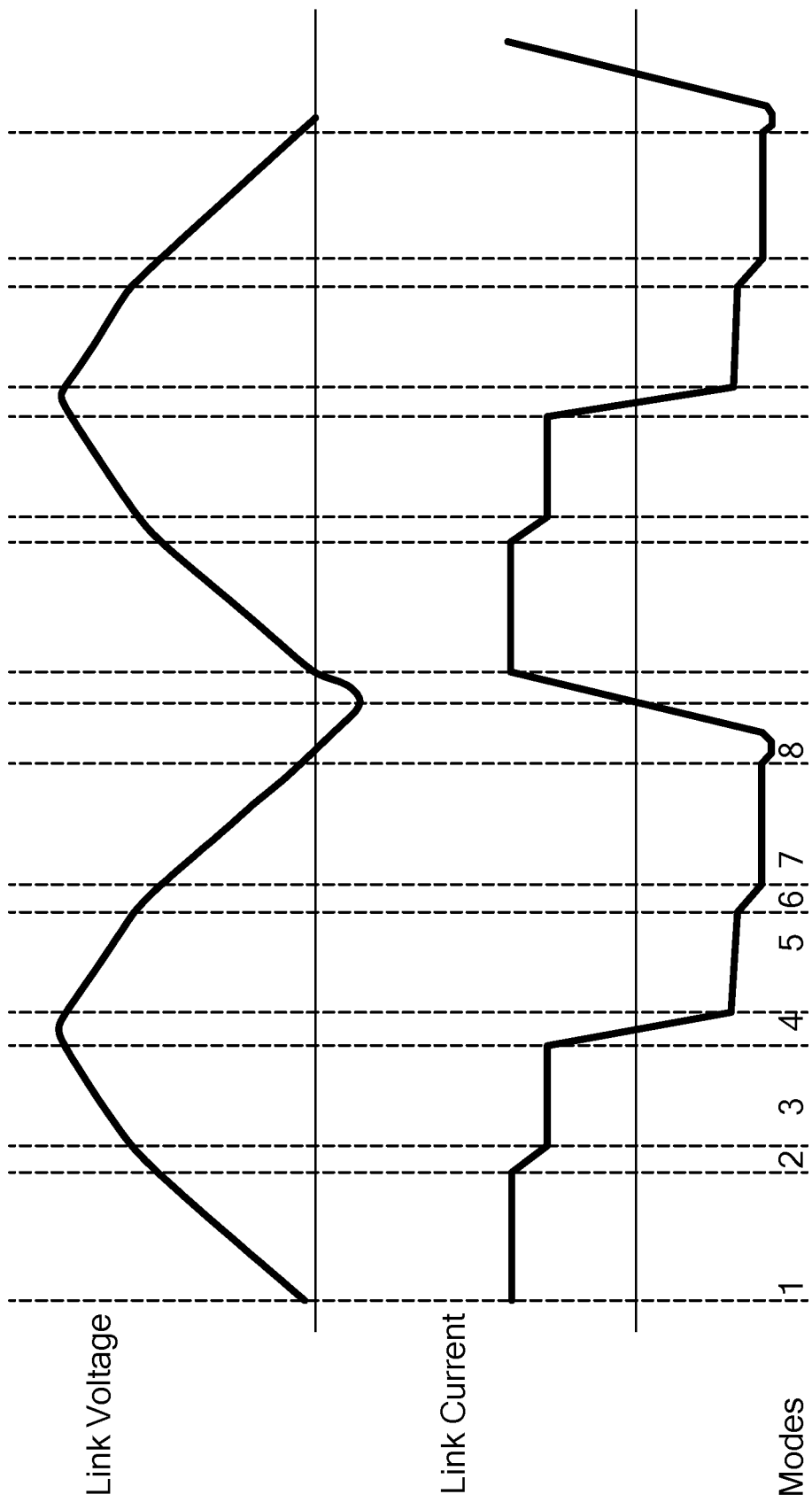
FIG. 12 illustrates example waveforms of the link voltage and link current of the three-phase AC-AC soft-switching power converter with a series partially resonant link during operation, in accordance with one or more embodiments.

FIG. 12 illustrates example waveforms of the link voltage and link current of the three-phase AC-AC soft-switching power converter with a series partially resonant link during operation, in accordance with one or more embodiments. The points in time separating the modes 1-8 are indicated along the bottom of the graph shown in FIG. 8 and are represented using vertical dotted lines.

III. Hard-Switching Power Converters a. Overview

The hard-switching converters shown in FIGS. 13-19 provide similar benefits as the soft-switching power converters discussed above. However, because no link inductor is included in the hard-switching converters of FIGS. 13-19, zero-current soft-switching cannot occur.

While the benefits of soft-switching are lost due to the removal of the link inductor, the modes of operation are simpler and thus allow for less complex control circuitry to operate the power converter. Some of the modes of operation are depicted in FIGS. 20A-20D.

b. Example Configurations

In the following configurations, each of the switches S0-S12 may be any type of controllable switching device, such as an IGBT or FET. The diodes may be any type of forward-conducting reverse-blocking device. The capacitor C may be any device that acts as a capacitor or has capacitance (e.g. film capacitors, ceramic capacitors, electrolytic capacitors, and/or parasitic capacitance from a device).

Figure 13:
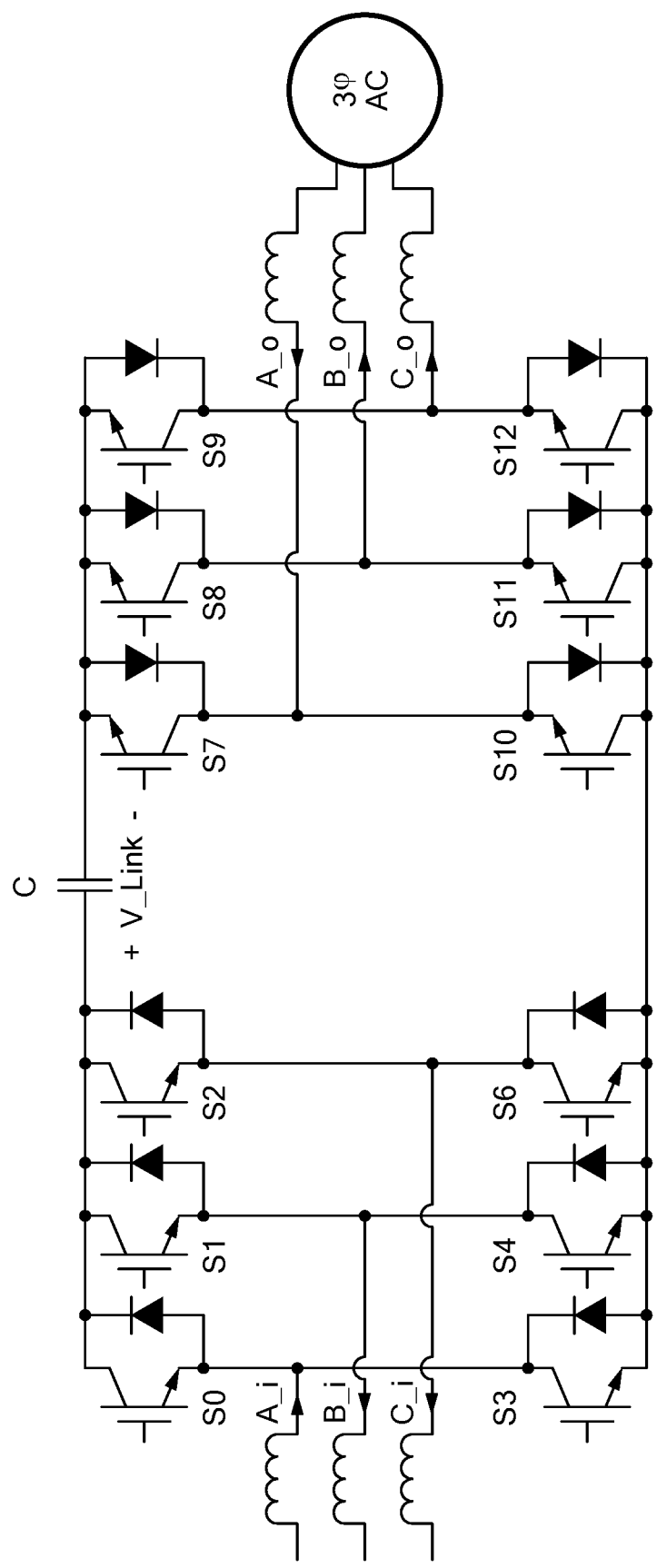
FIG. 13 illustrates a schematic of a three-phase AC-AC hard-switching power converter with a series capacitive link, in accordance with one or more embodiments.

FIG. 13 illustrates a schematic of a three-phase AC-AC hard-switching power converter with a series capacitive link, in accordance with one or more embodiments. The three-phase AC-AC hard-switching power converter with a series capacitive link includes 12 switches (S0-S4 and S6-S12) and 12 diodes in parallel with those switches. The series capacitive link includes a capacitor C, which facilitates the power transfer between the input side and the output side of the three-phase AC-AC hard-switching power converter with a series capacitive link.

Figure 14:
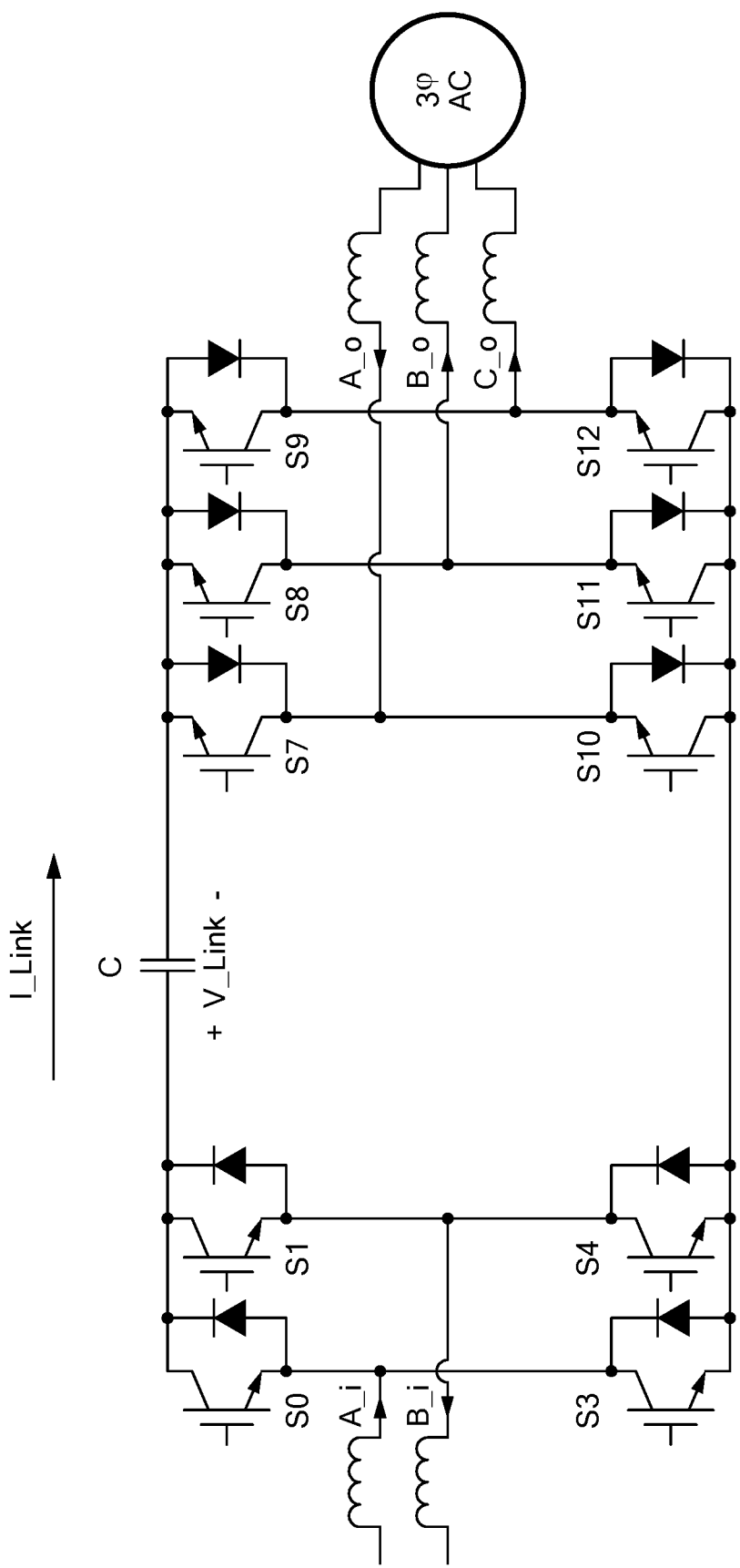
FIG. 14 illustrates a schematic of a DC to three-phase AC hard-switching power converter with a series capacitive link, in accordance with one or more embodiments.

FIG. 14 illustrates a schematic of a DC to three-phase AC hard-switching power converter with a series capacitive link, in accordance with one or more embodiments. The DC to three-phase AC hard-switching power converter with a series capacitive link includes 10 switches (S0-S4 and S7-S12) and 10 diodes in parallel with those switches. The series capacitive link includes a capacitor C, which facilitates the power transfer between the input side and the output side of the DC to three-phase AC hard-switching power converter with a series capacitive link.

Figure 15:
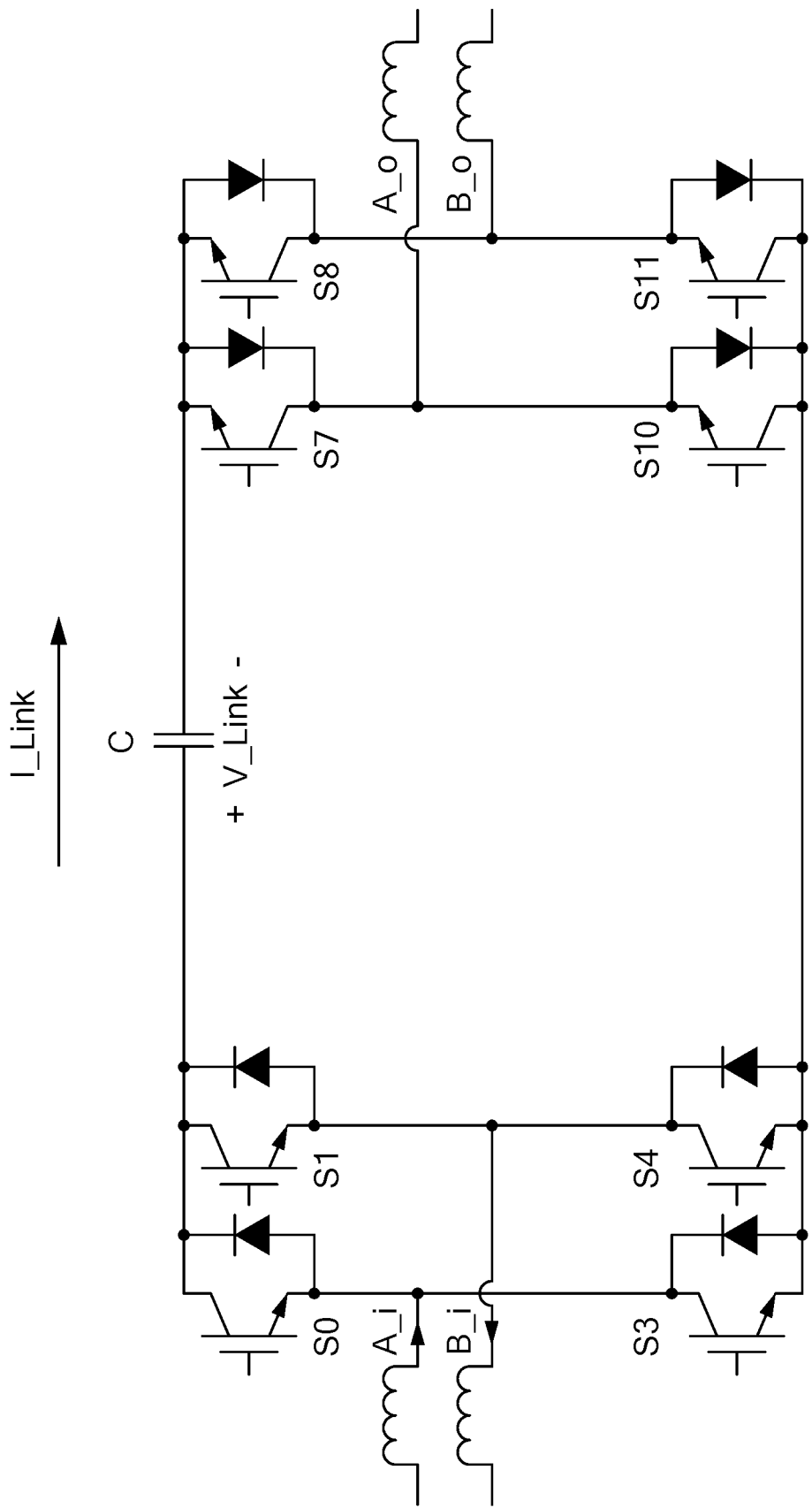
FIG. 15 illustrates a schematic of a DC-DC hard-switching power converter with a series capacitive link, in accordance with one or more embodiments.

FIG. 15 illustrates a schematic of a DC-DC hard-switching power converter with a series capacitive link, in accordance with one or more embodiments. The DC-DC hard-switching power converter with a series capacitive link includes 8 switches (S0, S1, S3, S4, S7, S8, S10, and S11) and 8 diodes in parallel with those switches. The series capacitive link includes a capacitor C, which facilitates the power transfer between the input side and the output side of the DC-DC hard-switching power converter with a series capacitive link.

Figure 16:
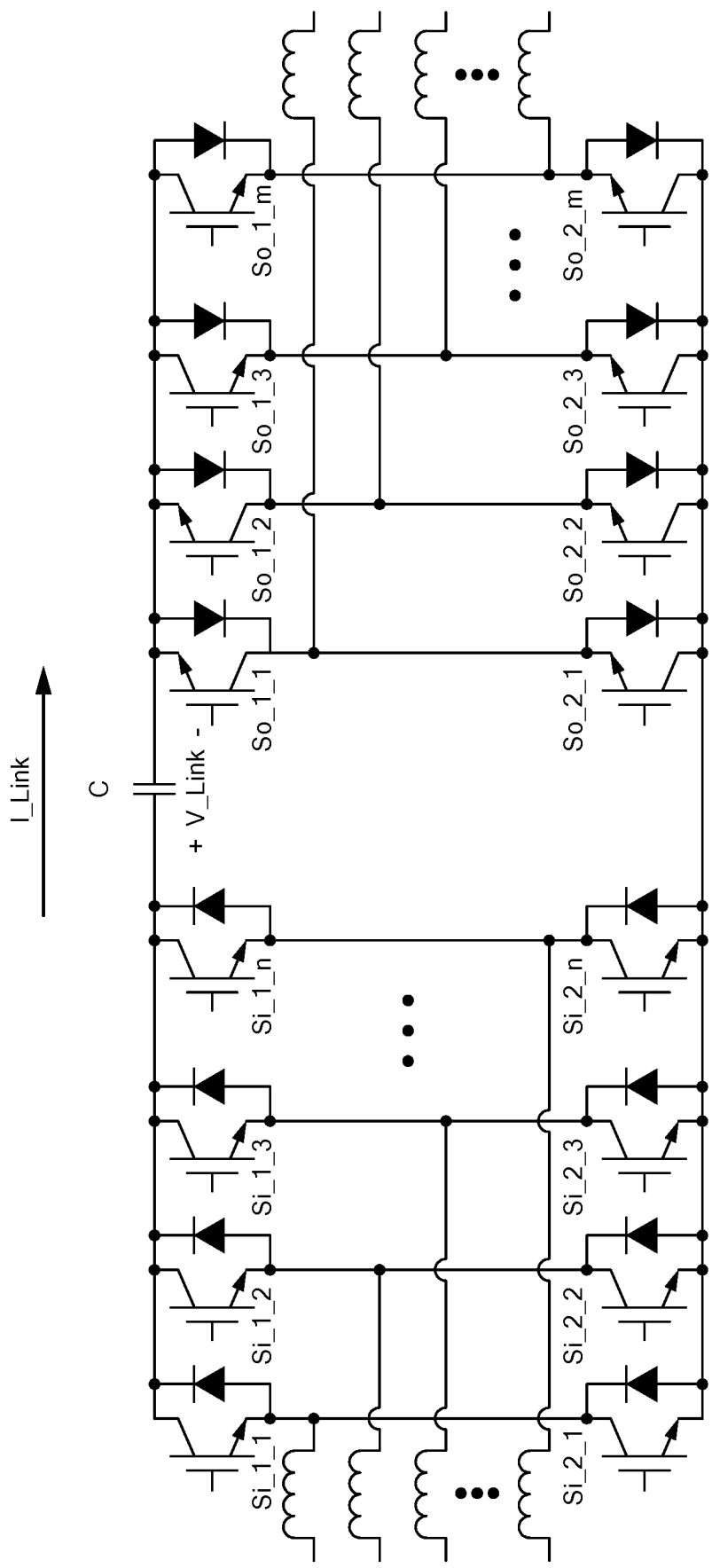
FIG. 16 illustrates a schematic of a poly-phase AC-AC hard-switching power converter with a series capacitive link, in accordance with one or more embodiments.

FIG. 16 illustrates a schematic of a poly-phase AC-AC hard-switching power converter with a series capacitive link, in accordance with one or more embodiments. The poly-phase AC-AC hard-switching power converter with a series capacitive link may include any number of phases at the input side and any number of phases at the output side. The switch and diode configuration of the poly-phase AC-AC hard-switching power converter with a series capacitive link may be similar to the switch and diode configuration of the three-phase AC-AC hard-switching power converter with a series capacitive link depicted in FIG. 13. The series capacitive link includes a capacitor C, which facilitates the power transfer between the input side and the output side of the DC-DC hard-switching power converter with a series capacitive link.

Figure 17:
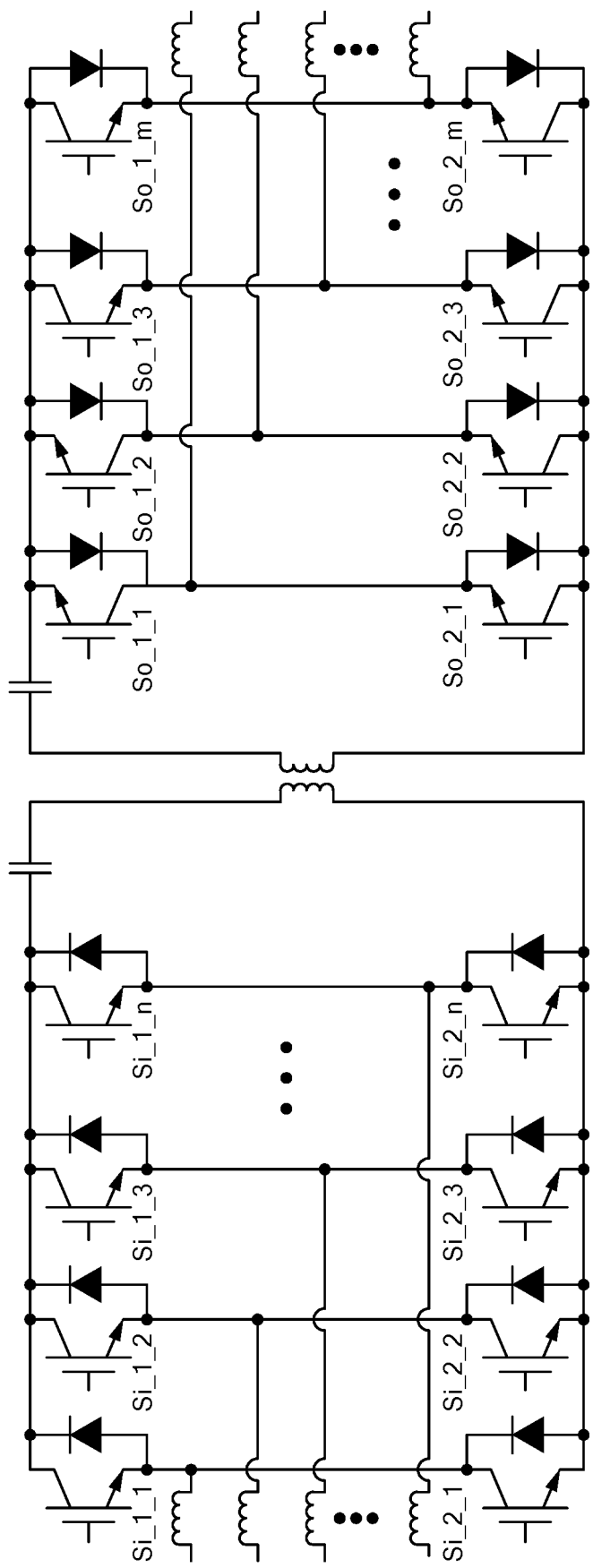
FIG. 17 illustrates a schematic of a poly-phase AC-AC hard-switching power converter with a series capacitive link and galvanic isolation, in accordance with one or more embodiments.

FIG. 17 illustrates a schematic of a poly-phase AC-AC hard-switching power converter with a series capacitive link and galvanic isolation, in accordance with one or more embodiments. The poly-phase AC-AC hard-switching power converter with a series capacitive link and galvanic isolation may be similar to the poly-phase AC-AC hard-switching power converter with a series capacitive link depicted in FIG. 16, with added galvanic isolation between the input side and the output side. As shown in FIG. 16, the poly-phase AC-AC hard-switching power converter with a series capacitive link and galvanic isolation may include a capacitor on both sides of the galvanic isolation. The galvanic isolation may be provided using a high-frequency transformer or an opto-isolator, among other forms of galvanic isolation.

Figure 18:
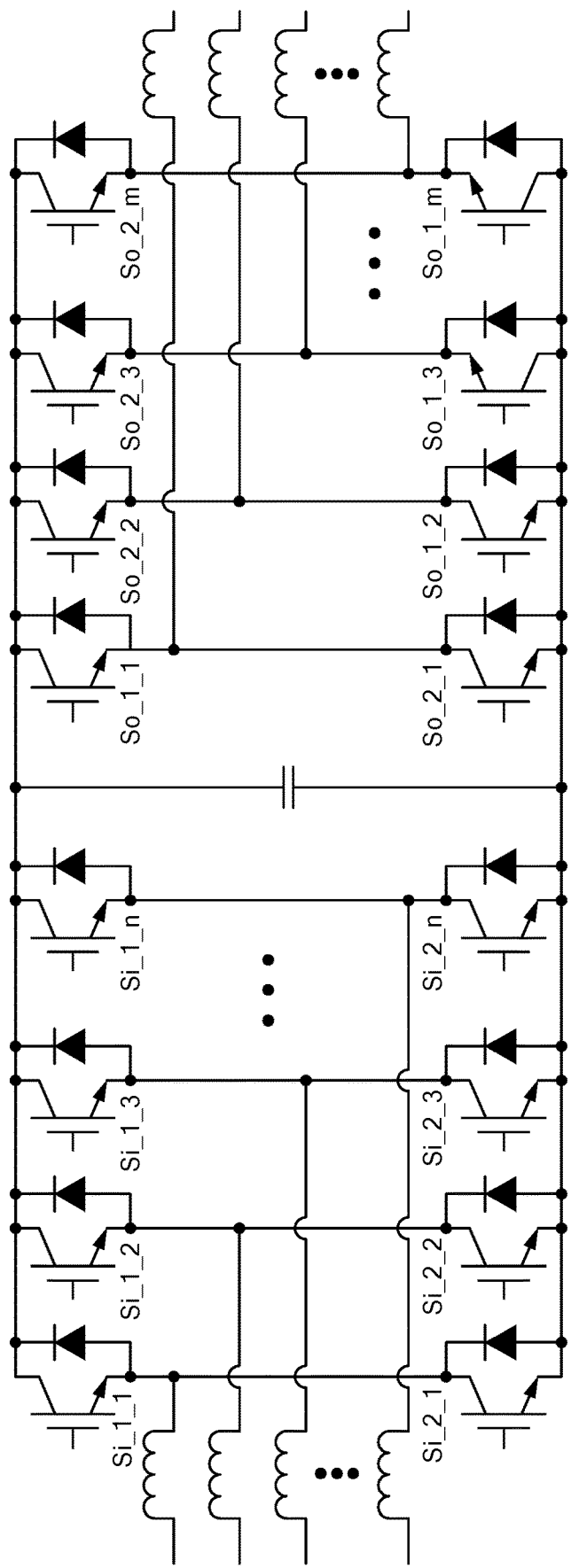
FIG. 18 illustrates a schematic of a poly-phase AC-AC hard-switching power converter with a parallel capacitive link, in accordance with one or more embodiments.

FIG. 18 illustrates a schematic of a poly-phase AC-AC hard-switching power converter with a parallel capacitive link, in accordance with one or more embodiments. The poly-phase AC-AC hard-switching power converter with a parallel capacitive link may include an input side connected to a power source, an output side connected to a load, and a capacitor that is connected in parallel between the input side and the output side.

Figure 19A:
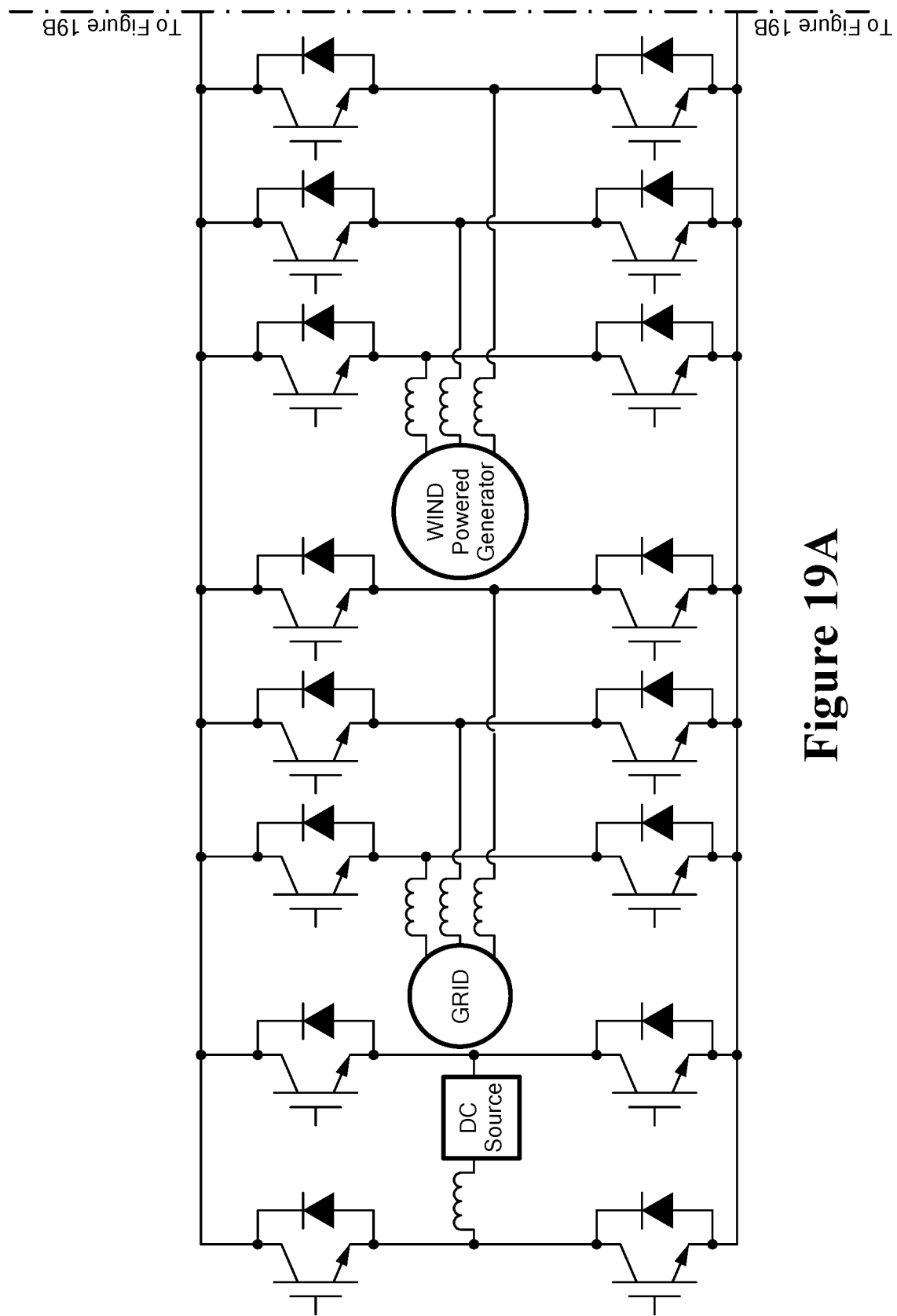
FIG. 19 illustrates a schematic of microgrid formed using a hard-switching power converter with a series capacitive link, in accordance with one or more embodiments.
Figure 19B:
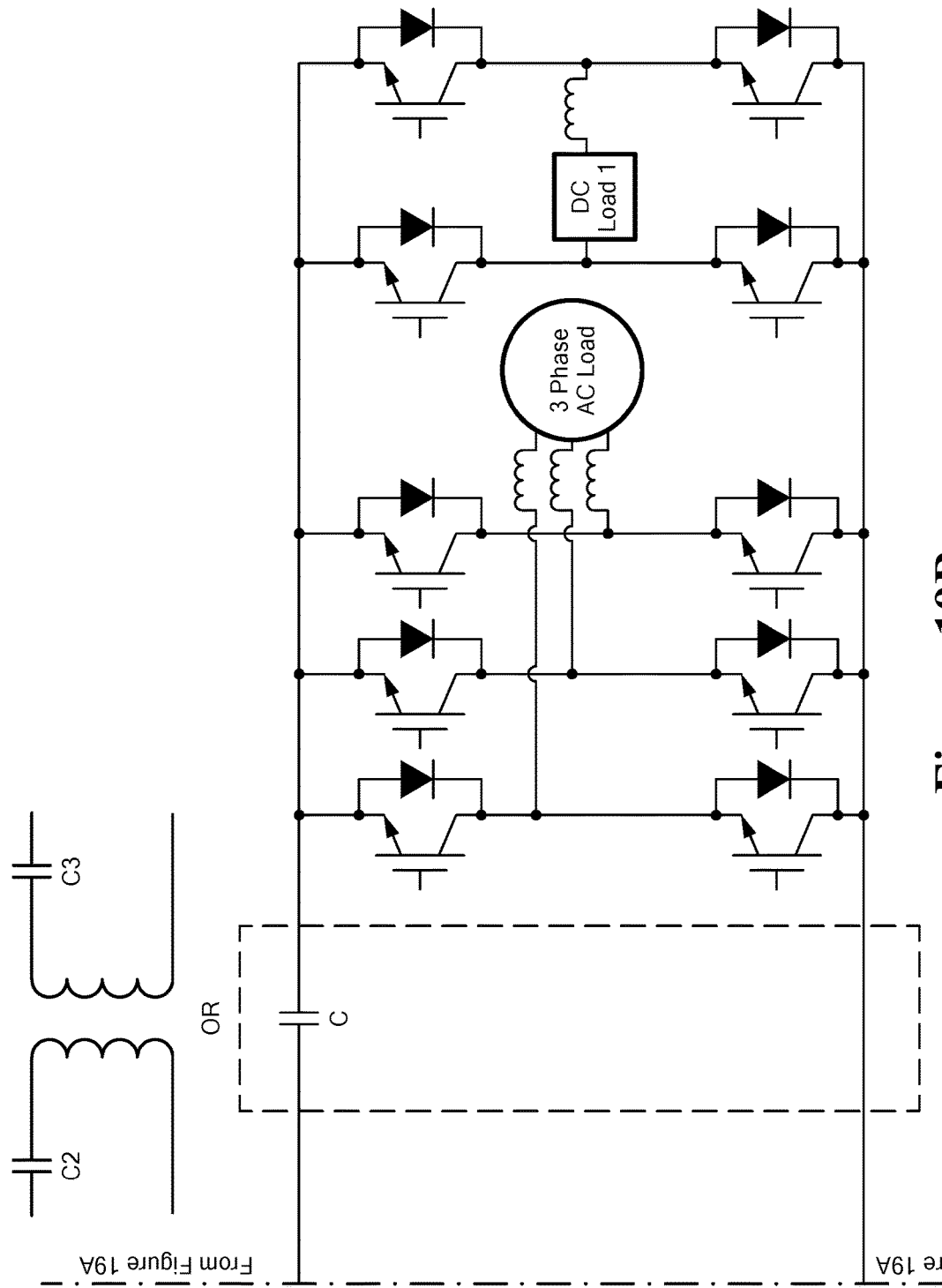

FIG. 19 illustrates a schematic of microgrid formed using a hard-switching power converter with a series capacitive link, in accordance with one or more embodiments. A microgrid is a small hybrid power system that may include several sources and several loads. The power converter of FIG. 19 shows an example of a microgrid that contains a three-phase source connected to the grid, a wind generator, a DC voltage source, a three-phase load, and a DC load. In FIG. 19, a series capacitive link is used for transferring power from all the sources to all the loads.

c. Example Modes of Operation with Series Capacitive Link

FIGS. 20A-20D illustrates a schematic of example modes of operation of the three-phase AC-AC hard-switching power converter with a series capacitive link, in accordance with one or more embodiments. The three-phase AC-AC hard-switching power converter operates in a cycle comprising 4 modes of operation. Modes 1, 3, 5, and 7 are depicted in FIGS. 20A-20D, respectively. Note that modes 1, 3, 5, and 7 of the hard-switching power converter shown in FIGS. 20A-20D are similar to the modes 1, 3, 5, and 7 of the soft-switching power converter shown in FIGS. 11A, 11C, 11E, and 11G. Although there are only 4 modes of operation in the hard-switching power converter configurations, the modes are numbered to omit 2, 4, 6, and 8, so that modes of operation 1, 3, 5, 7 may be more clearly analogized with the modes of operation of the soft-switching power converter configurations.

Each of the 4 modes are described in more detail below with respect to a three-phase AC-AC hard-switching power converter with a series capacitive link, similar to the poly-phase AC-AC hard-switching power converter with a parallel capacitive link depicted in FIG. 13.

Note that "hard-switching" refers to switching that is not soft-switching. Because there is no inductor included in the hard-switching power converter configurations, the link does not resonate when shorted. As a result of this lack of resonating, neither zero voltage switching (ZVS) nor zero current switching (ZCS) can be achieved in these hard-switching configurations.

Figure 20A:
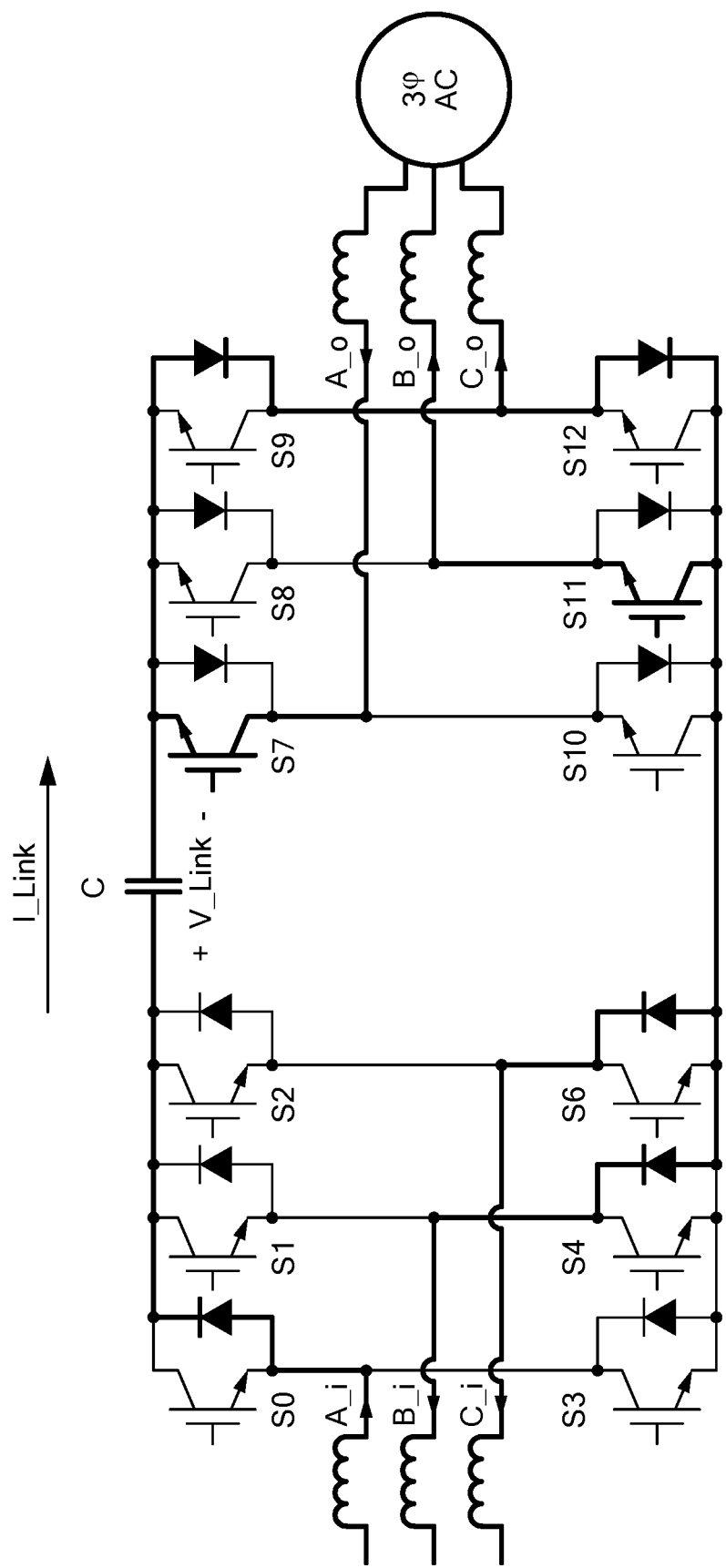
FIGS. 20A-20D illustrates a schematic of example modes of operation of the three-phase AC-AC hard-switching power converter with a series capacitive link, in accordance with one or more embodiments.

FIG. 20A: Mode 1 (Charging)

During mode 1, input phases conduct through the diodes connected in parallel with switches S0, S4, and S6 into the series link. In mode 1, the link current ($I_{link}$) is the current flowing through input-side phase A ($I_{A\_i}$). This is accomplished by turning on switches S7 and S11. These switches may be selected according to the output voltage references. As the link current flows into the capacitor C, the capacitor C charges up, thus allowing current to flow through it and increasing the voltage across it. Since the switching frequency is much higher than the frequencies of the input and output currents, during each cycle, the currents are almost constant. Therefore, during the charging and discharging modes, the link inductor may act as a short circuit. Once the average of the voltage across the input phase pair AC is equal to a reference voltage, switch S2 is turned on; this initiates mode 3. Turning on switch S2 results in the diode in parallel with S6 to be turned off.

Figure 20B:
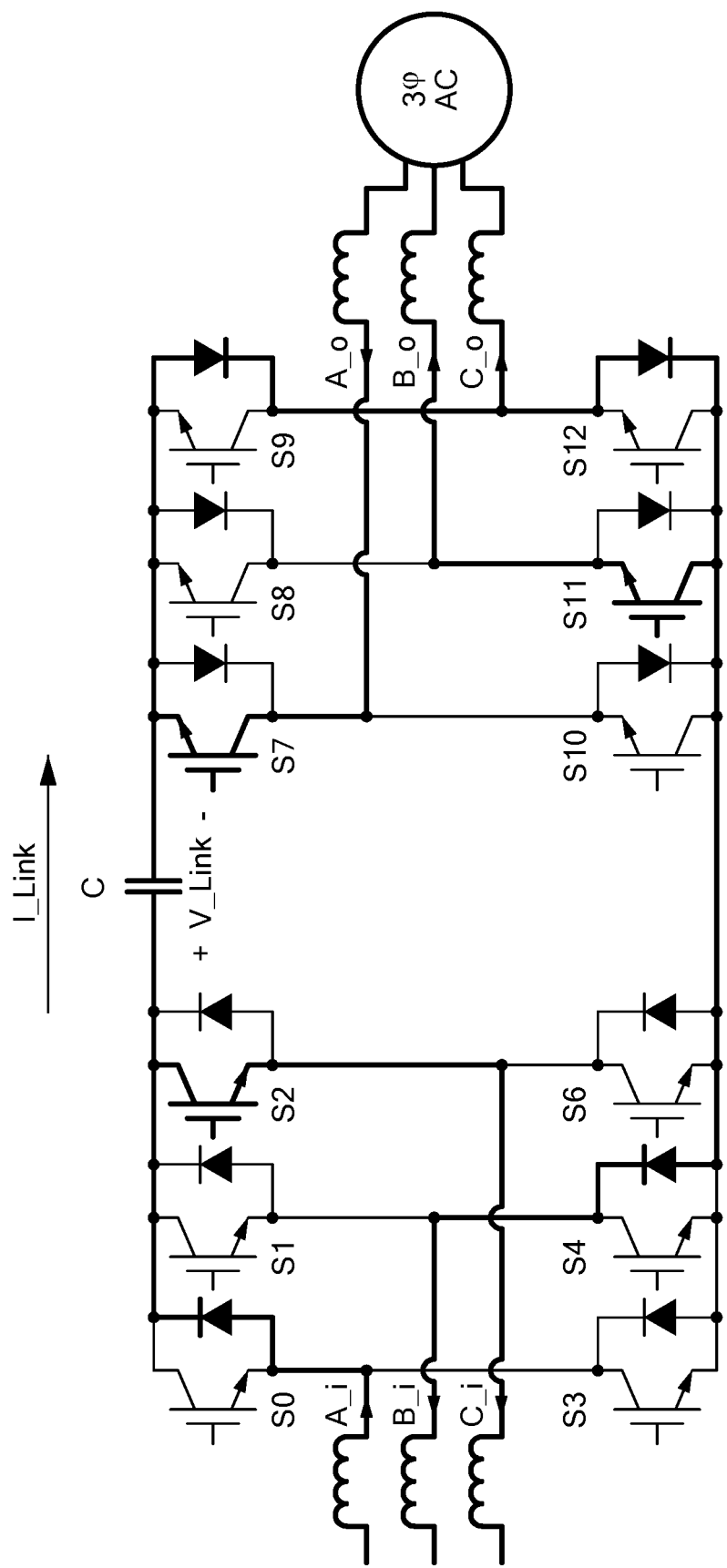

FIG. 20B: Mode 3 (Charging)

During mode 3, phase B charges the link capacitor. Once the average of the voltage across the input-side phase-pair AB meets a reference voltage, switch S6 is turned on to effectively "short circuit" the input-side.

Figure 20C:
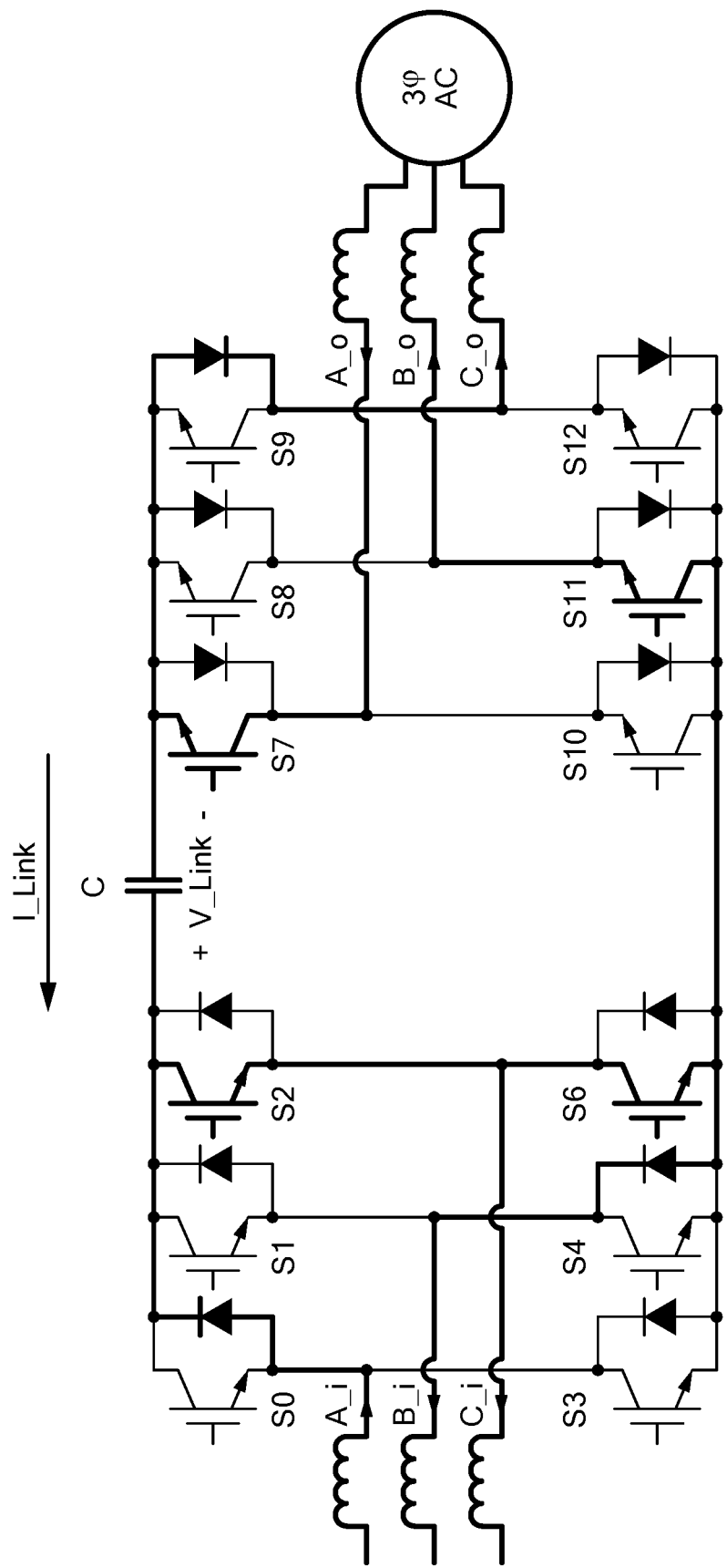

FIG. 20C: Mode 5 (Discharging)

During mode 5, the diode in parallel with S12 will stop conducting and the capacitor discharges through the output side phase B. When the average of the voltage across output phase pair BC meets its reference; switch S12 is turned on.

Figure 20D:
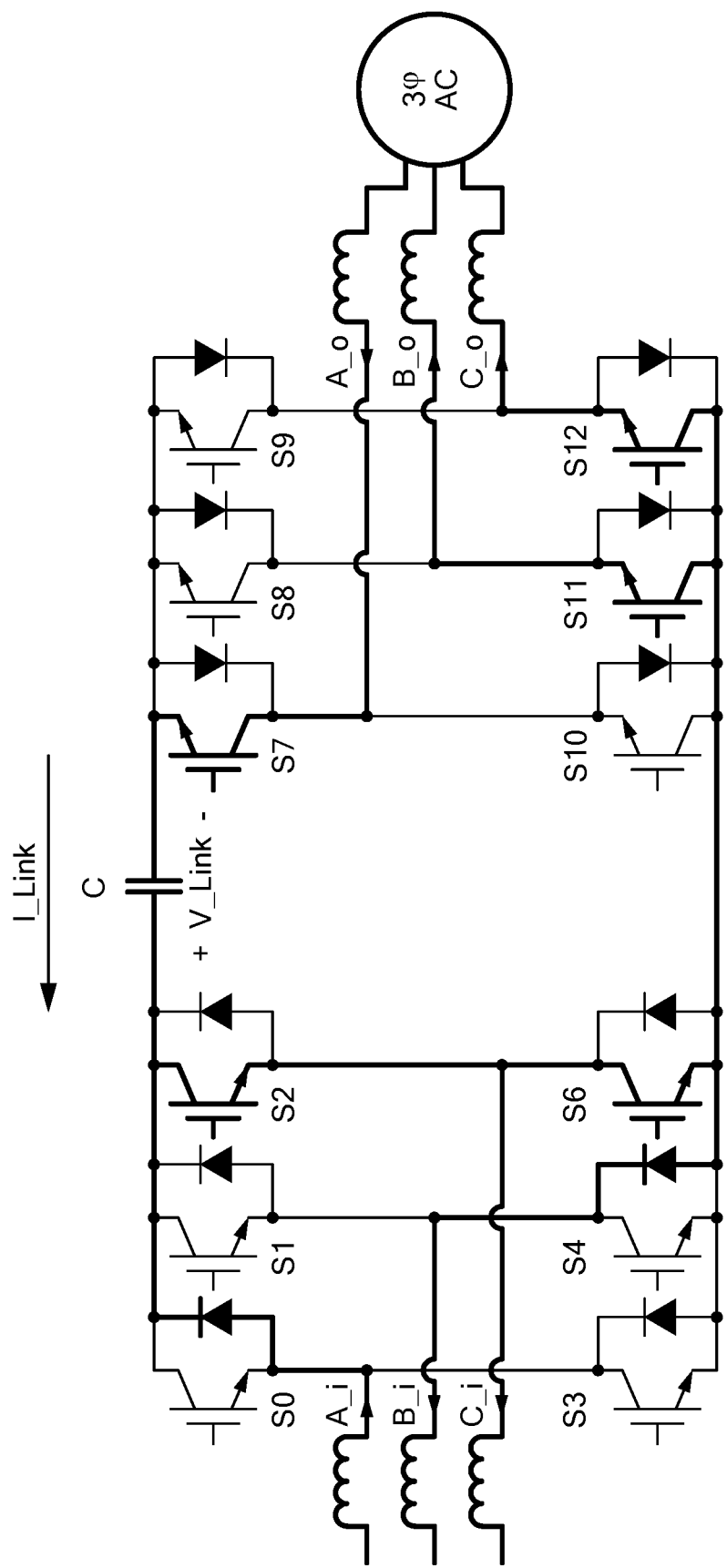

FIG. 20D: Mode 7 (Discharging)

During mode 7, the diode in parallel with S9 stops conducting and the capacitor discharges through the output side phase A. The link current ($I_{link}$) during mode 7 is equal to the output-side current of phase A ($I_{A\_o}$). When the energy stored in the link is fully discharged, mode 1 begins by turning off switches S2, S6, and S12.

d. Example Modes of Operation with Parallel Capacitive Link

FIGS. 21A-21D illustrates a schematic of example modes of operation of the three-phase AC-AC hard-switching power converter with a parallel capacitive link, in accordance with one or more embodiments. Similarly to the hard-switching configurations with series capacitive link described above, the three-phase AC-AC hard-switching power converter with a parallel capacitive link operates in a cycle consisting of 4 modes of operation. Although the schematic of this converter appears to be similar to that of a common DC-link three-phase AC-AC converter shown in FIG. 1, the principles of the operation of the two converters differ in a number of ways. In FIG. 1, two different converters (a rectifier and an inverter) are connected and a large capacitor is placed between them to decouple them. Therefore, in FIG. 1, the input side and the output side switch bridges operate individually. However, in FIGS. 21A-21D, the input-side switch bridge cannot operate without the existence of the output switch bridge—it is a single converter. Modes 1, 3, 5, and 7 are depicted in FIGS. 21A-21D, respectively. Note that modes 1, 3, 5, and 7 of the hard-switching power converter shown in FIGS. 21A-21D are similar to the modes 1, 3, 5, and 7 of the soft-switching power converter shown in FIGS. 11A, 11C, 11E, and 11G. Although there are only 4 modes of operation in the hard-switching power converter configurations, the modes are numbered to skip 2, 4, 6, and 8 so that modes of operation 1, 3, 5, 7 may be more clearly analogized with the modes of operation of the soft-switching power converter configurations.

The principles of the operation of the hard-switching power converter with parallel capacitive link are modified from those of the hard-switching power converter with series capacitive link. When the input side is charging the link, the output side is not connected to the capacitive link. Also, when the link is being discharged to the output side, the input side is not connected to the capacitive link. Operating the hard-switching power converter in this manner results in improved efficiency. Each of the 4 modes are described in more detail below with respect to a three-phase AC-AC hard-switching power converter with a parallel capacitive link, similar to the poly-phase AC-AC hard-switching power converter with a parallel capacitive link depicted in FIG. 18.

Note that "hard-switching" refers to switching that is not soft-switching. Because there is no inductor included in the hard-switching power converter configurations, the link does not resonate when shorted. As a result of this lack of resonating, neither zero voltage switching (ZVS) nor zero current switching (ZCS) can be achieved in these hard-switching configurations.

Figure 21A:
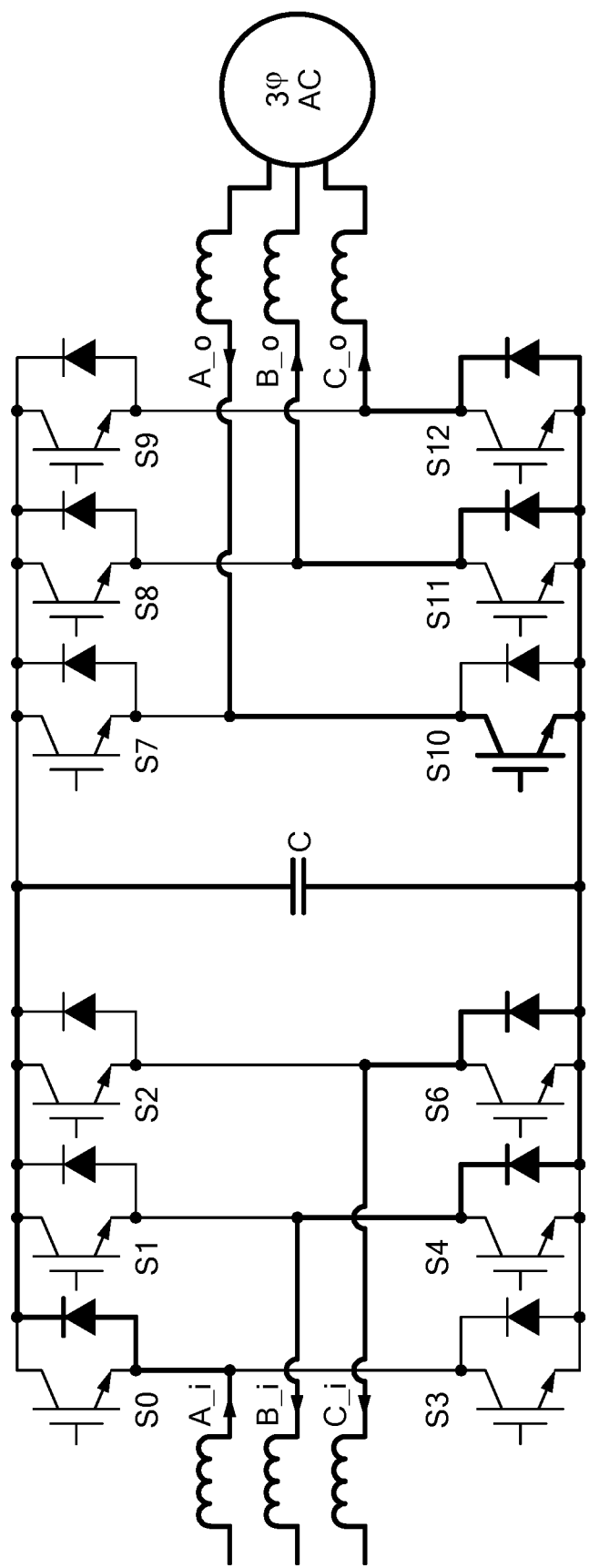
FIGS. 21A-21D illustrate a schematic of example modes of operation of the three-phase AC-AC hard-switching power converter with a parallel capacitive link, in accordance with one or more embodiments.

FIG. 21A: Mode 1 (Charging)

During mode 1, input phases conduct through the diodes connected in parallel with switches S0, S4, and S6 into the series link. In mode 1, the link current ($I_{link}$) is the current flowing through input-side phase A ($I_{A\_i}$). One switch at the output-side along with two diodes provide a path for output currents; however, the output phases are effectively not connected to the link. As the link current flows into the capacitor C, the capacitor C charges up, thus allowing current to flow through it and increasing the voltage across it. Since the switching frequency is much higher than the frequencies of the input and output currents, during each charging or discharging mode, the currents are almost constant. Once the average of the voltage across the input phase pair AC is equal to a reference voltage, switch S2 is turned on; this initiates resonating mode 2.

Figure 21B:
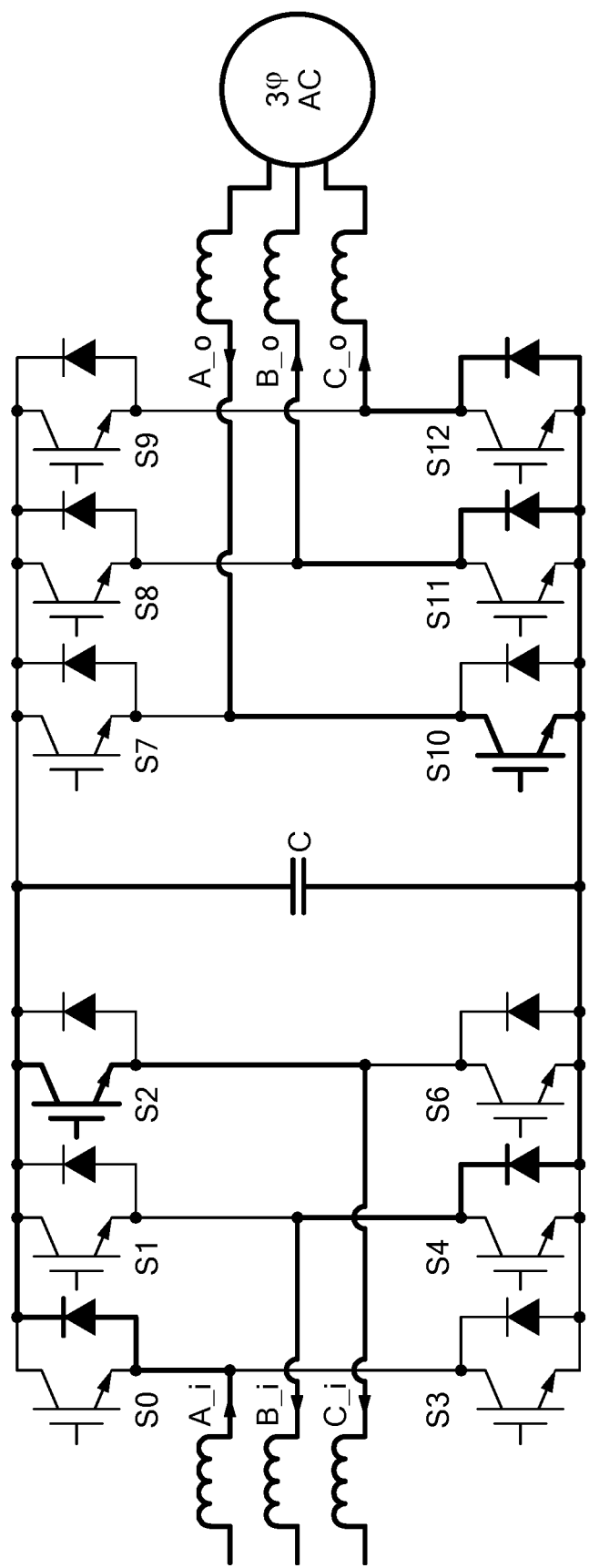

FIG. 21B: Mode 3 (Charging)

Turning on switch S2 results in the diode in parallel with S6 to be turned off. During mode 3, phase B charges the link capacitor. When the average of the voltage across phase pair AB is equal to a reference voltage, switches S1 and S8 are turned on. After turning on switch S1, the diode in parallel with S4 turns off. By turning on switch S8, the diode in parallel with S11 turns off. Therefore, after mode 3, the input side is effectively disconnected from the link and the output side is effectively connected to the link.

Figure 21C:
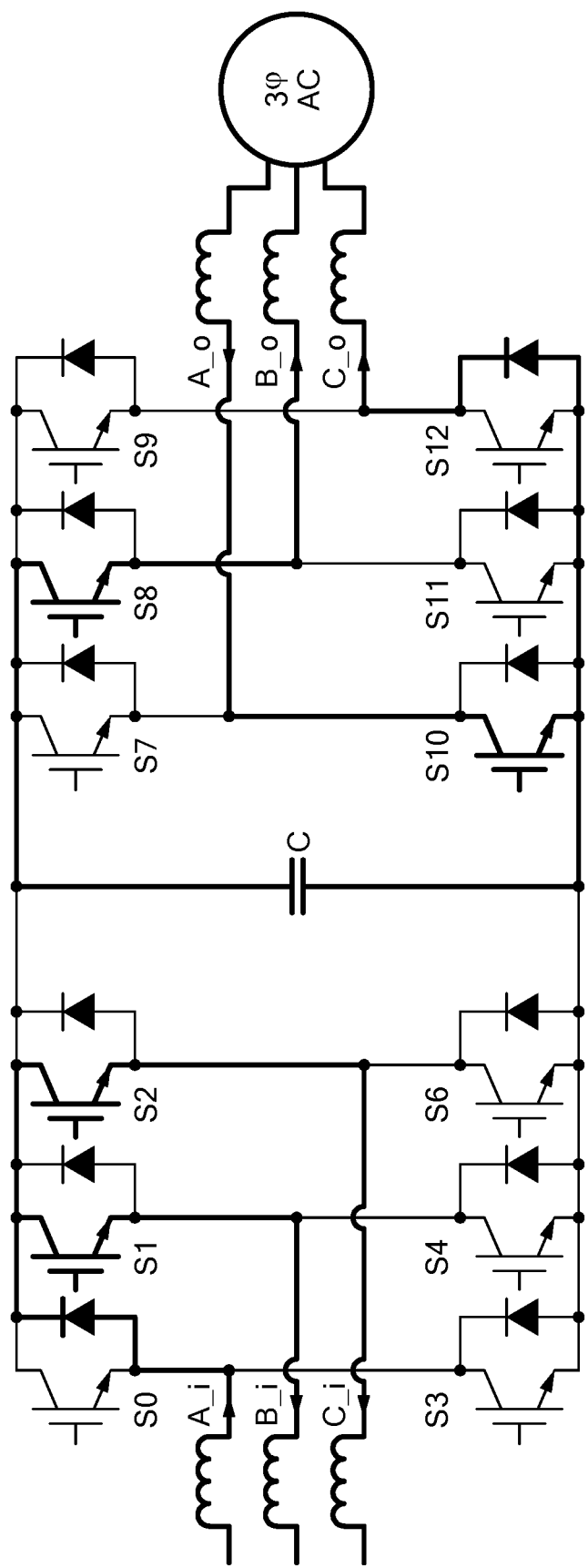

FIG. 21C: Mode 5 (Discharging)

The link current during mode 5 is equal to the current of phase B; however, the polarity of the link current is opposite to that of modes 1 and 3. Because of the opposite polarity, the link capacitor will be discharged during mode 5. When the average voltage across output phase pair BC meets its reference, switch S9 is turned on.

Figure 21D:
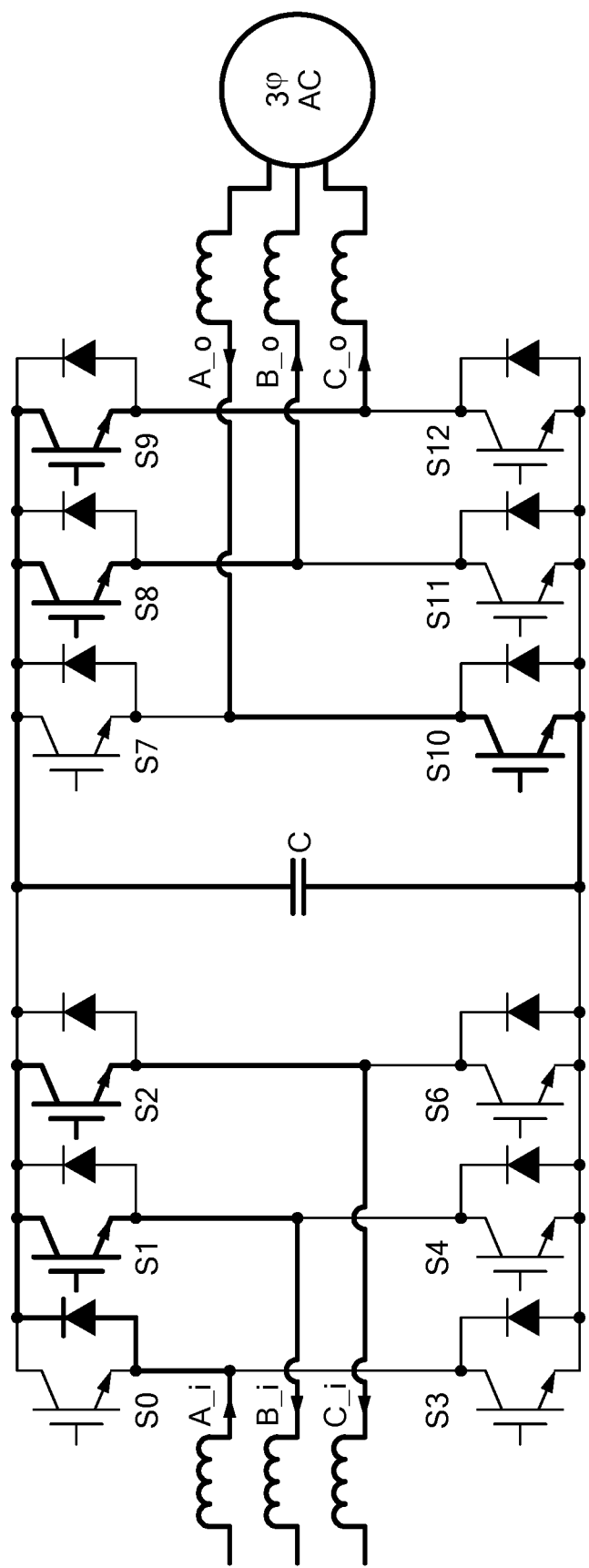

FIG. 21D: Mode 7 (Discharging)

When switch S9 is turned on, the diode in parallel with S12 turns off. Therefore, the current of the link will be equal to the current of phase A at the output side. This current will discharge the link capacitor until the link capacitor is fully discharged. Once the link capacitor is fully discharged, switches S8, S9, S1, and S2 will be turned off.

e. Example Link Voltage and Current Waveforms

FIG. 22 illustrates example waveforms of the link voltage and link current of the three-phase AC-AC hard-switching power converter with a series or parallel capacitive link during operation, in accordance with one or more embodiments. The points in time separating the modes 1, 3, 5, and 7 are indicated along the bottom of the graph shown in FIG. 22 and are represented using vertical dotted lines f. Control Scheme A simplified control scheme is provided for some embodiments of the capacitive link universal converters described above with respect to FIGS. 13-19.

A simple open-loop control scheme that can be implemented with a fixed switching frequency is described as follows. The principles of operation are described herein with reference to the three-phase AC-AC configuration illustrated in FIG. 13. FIG. 23A-23E illustrate the modes of operation of the converter. When operating at the border of CCM and DCM, each cycle is divided into 4 modes. The link voltage and current are illustrated in FIG. 24. Note that modes 1-4 described here are similar to modes 1, 3, 5, and 7, described above and illustrated in FIGS. 20A-20D. In the control scheme described here, the converter operates in DCM mode, with a $5^{th}$ mode during which the link voltage remains zero.

The link may be energized from various phases of the power source during modes 1 and 2 and de-energized to the output load during modes 3 and 4. Here it is assumed that the voltage across phase pair AB at the input side is the maximum input line to line voltage, and it is positive. Also it is assumed that the voltage across the output phase pair AB has the maximum output line to line voltage and it is negative. In general, the phase pairs carrying the maximum line to line input and output voltages do not need to be the same. Moreover, the phase pairs carrying the maximum line to line voltages change over a cycle.

Figure 23A:
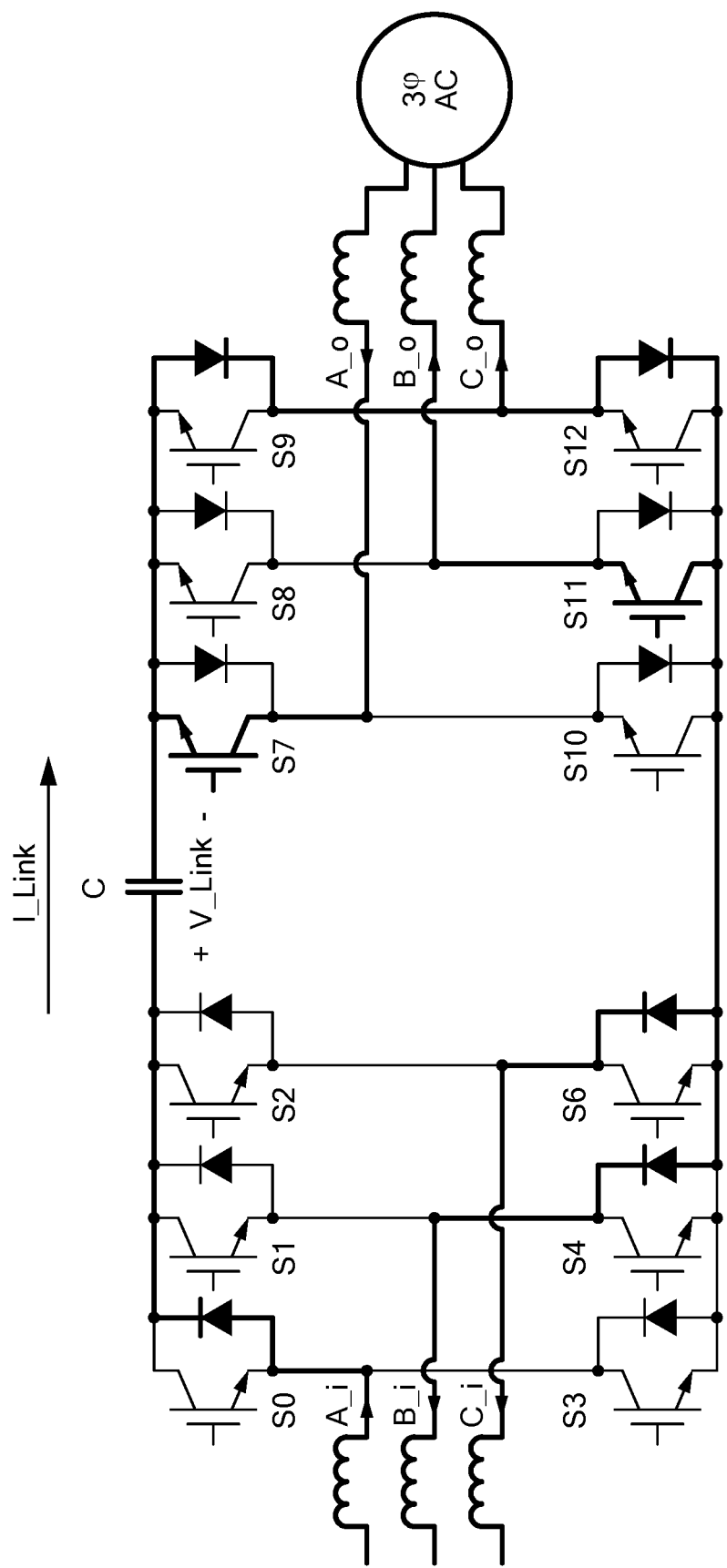
FIGS. 23A-23E illustrate a schematic of example modes of operation a three-phase AC-AC hard-switching power converter with series capacitive link, in accordance with one or more embodiments.
Figure 24:
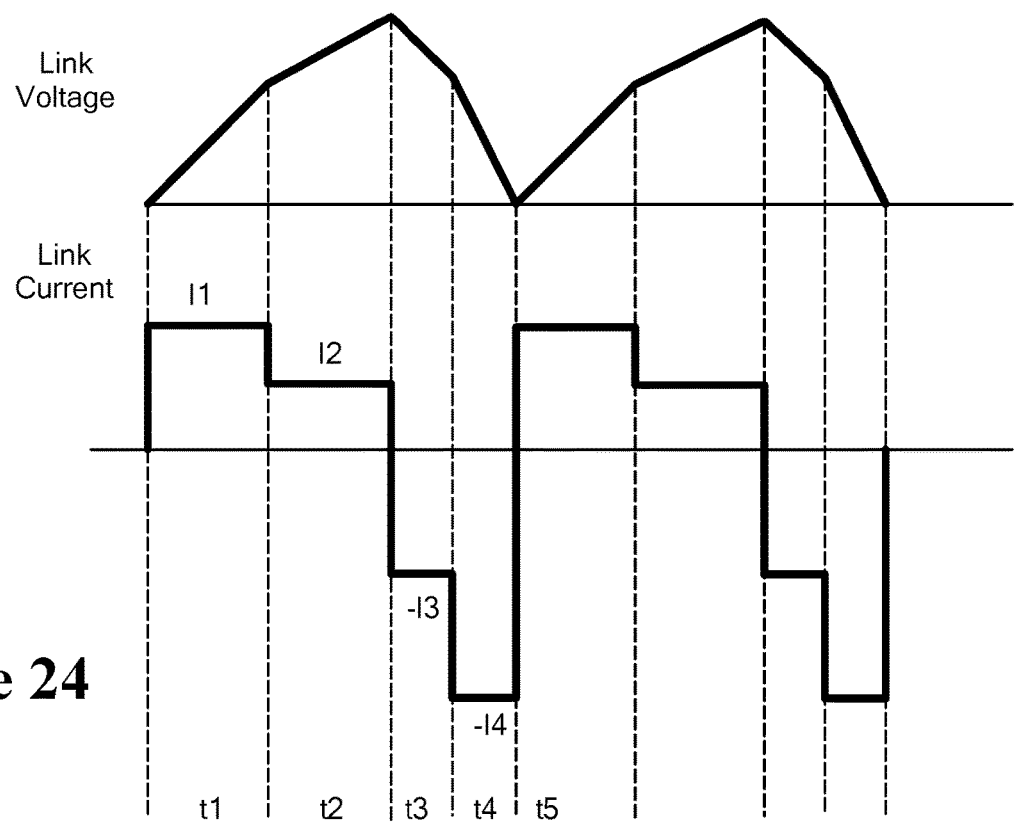
FIG. 24 illustrates example waveforms of the link voltage and link current of a three-phase AC-AC hard-switching power converter with series capacitive link during operation at a border between continuous conduction mode (CCM) and discontinuous conduction mode (DCM)

FIG. 23A: Mode 1 (Charging)

In mode 1, the link current ($I_{Link}$) is equal to the current flowing through input-side phase A ($I_{A\_i}$). During this mode, the antiparallel diodes corresponding to switches S0, S4, and S6 conduct, and charge the link capacitor. At the output side switches S7 and S11 are conducting along with anti-parallel diodes corresponding to S9 and S12. The switches are selected according the output voltage references. Since a positive current is flowing into the capacitor C, the voltage across this capacitor increases. When the average of the voltage across input phase-pair AC meets its reference, switch S2 is turned.

Figure 23B:
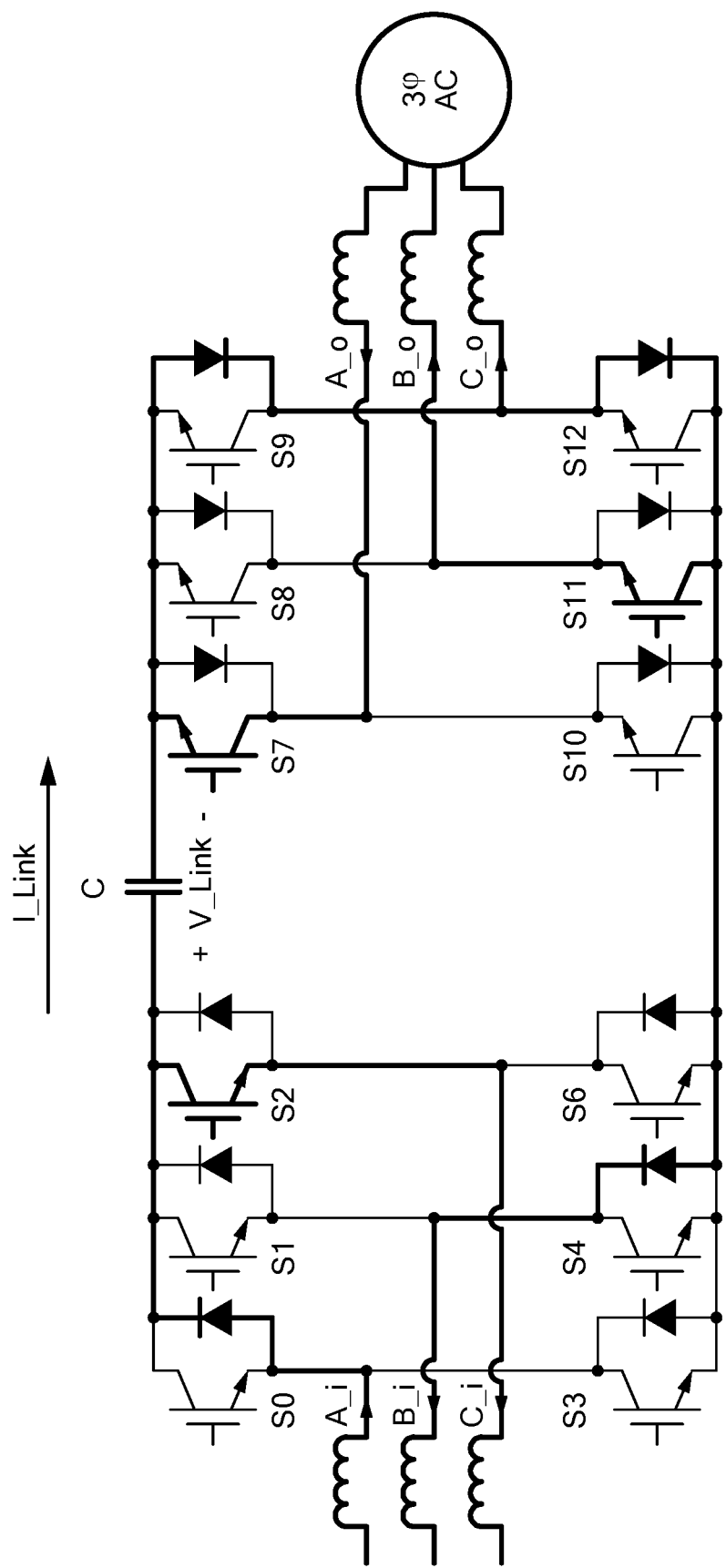

FIG. 23B: Mode 2 (Charging)

Turning on switch 2 turns off the antiparallel diode corresponding to switch S6. During mode 2, phase B charges the link capacitor. Once the average of the voltage across input-side phase-pair AB meets a reference voltage, switch S6 is turned on, which turns off antiparallel diode corresponding to switch S12.

Figure 23C:
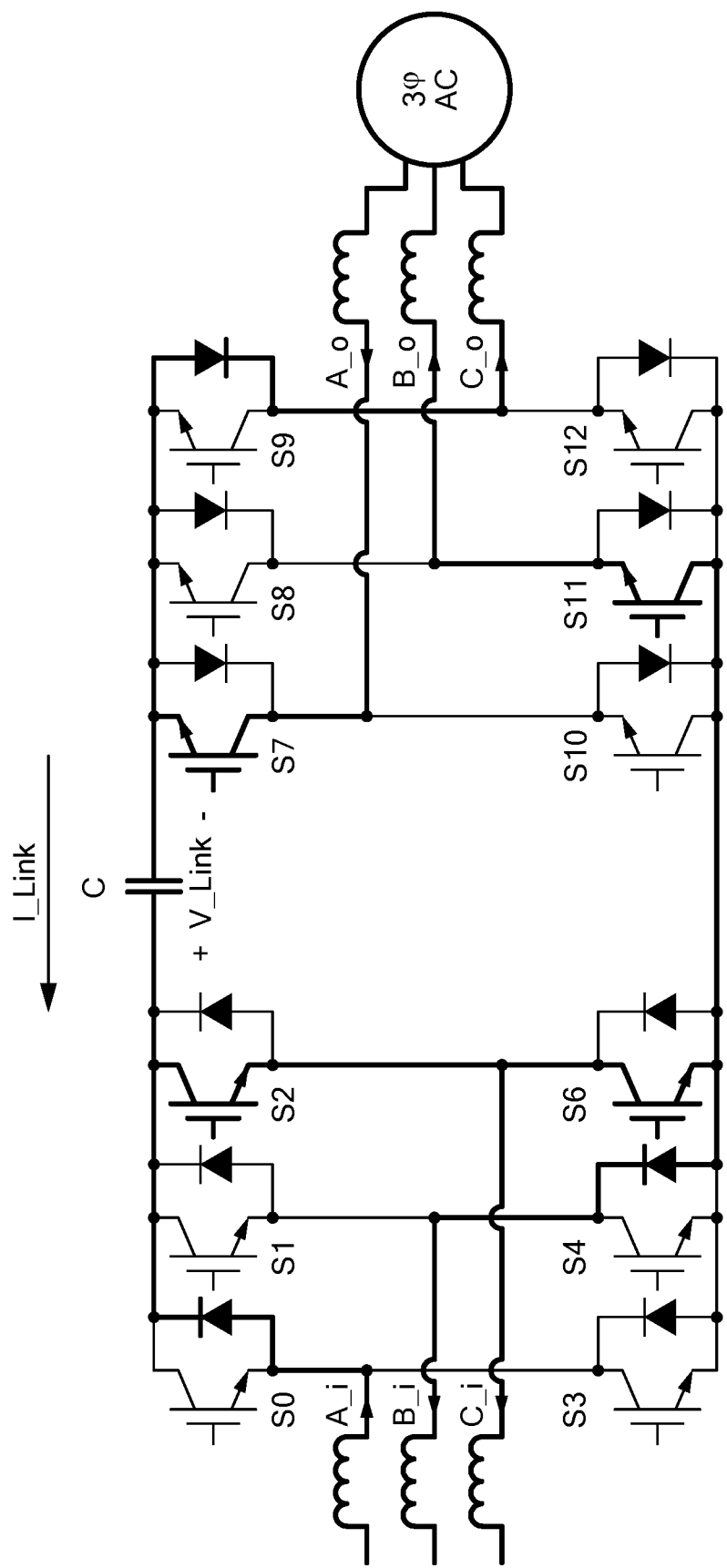

FIG. 23C: Mode 3 (Discharging)

During mode 3, the link current ($I_{Link}$), which is negative, is equal to the output-side current of phase B ($I_{B\_o}$). Thus, the link voltage decreases, causing the link capacitor to discharge into the output. When the voltage across the output-side phase-pair BC becomes equal to a reference voltage, antiparallel diode corresponding to switch S9 is forced to turn off by turning on S12.

Figure 23D:
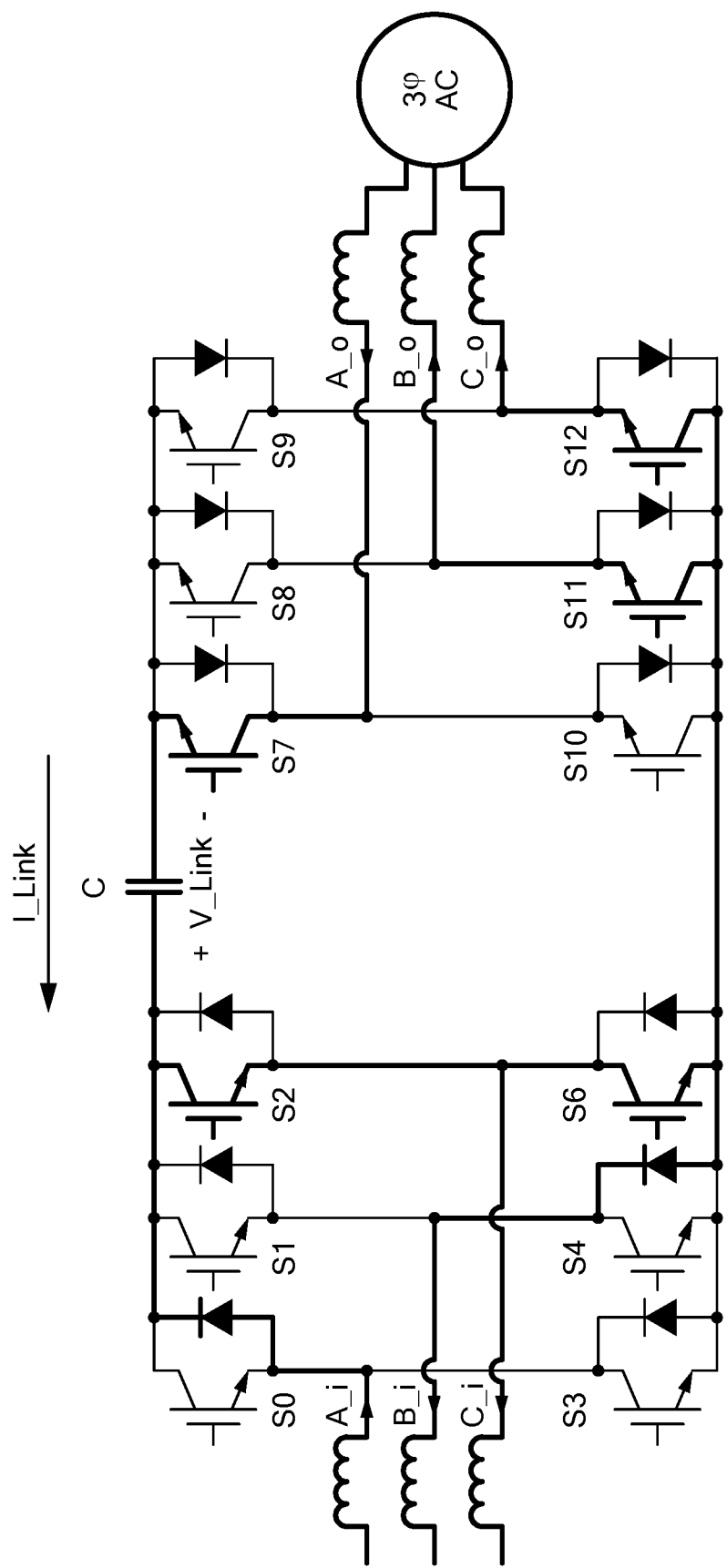
Figure 23E:
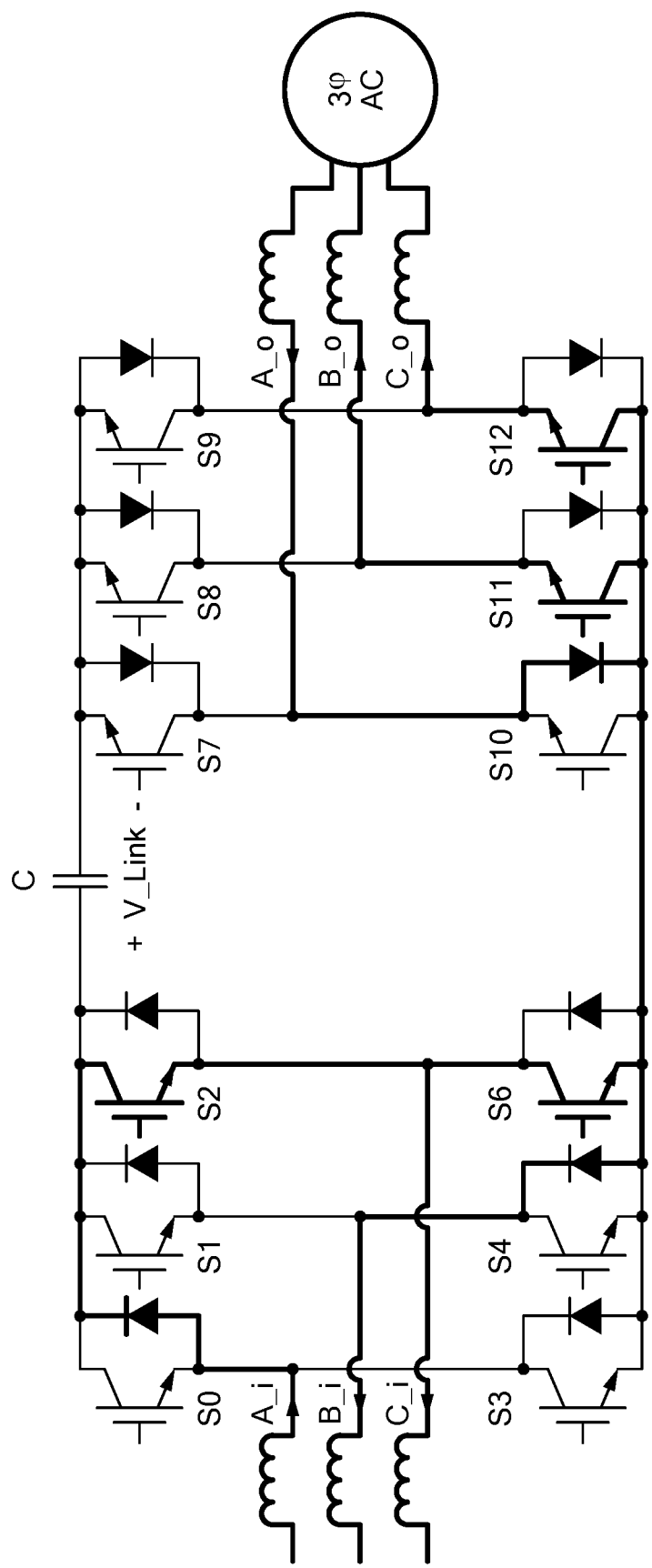

FIG. 23D: Mode 4 (Discharging)

During mode 4, the energy stored in the capacitor C continues to discharge into the output. The link current ($I_{Link}$) during mode 7 is equal to the output-side current of phase A ($I_{A\_o}$). This modes continues until the link capacitor is fully discharged and its voltage becomes zero.

FIG. 23E: Mode 5

In the control scheme described here, the converter can operate in DCM mode; thus, there is an additional mode 5, during which no current passes the link capacitor and its voltage remains zero. See the link voltage and current in FIG. 25.

Finally, switches S12, S6, and S2 are tuned off to initiate Mode 1.

Figure 25:
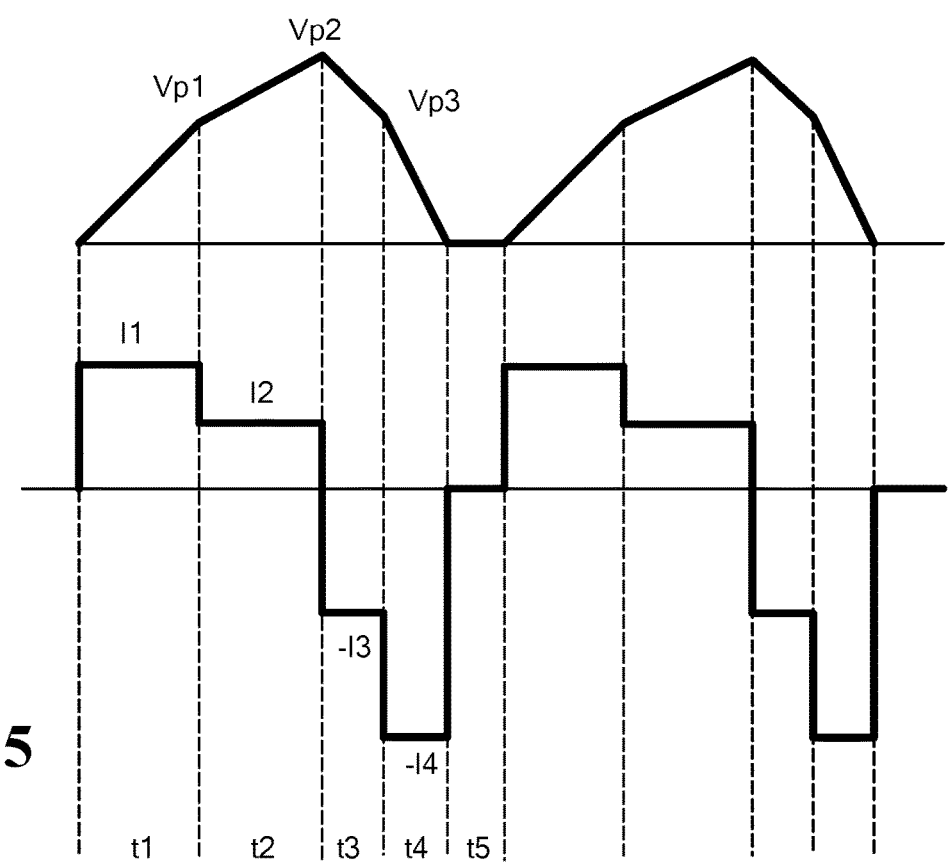
FIG. 25 illustrates example waveforms of the link voltage and link current of a three-phase AC-AC hard-switching power converter with series capacitive link during operation in discontinuous conduction mode (DCM)

FIG. 25 shows the link voltage and current in the AC-AC converter when operating in DCM mode. $V_1$, $V_2$, $V_3$, and $V_4$ are the voltages across the input and output phase pairs that do not have the maximum line to line voltages. $I_1$, $I_2$, $I_3$, and $I_4$ are the input and output currents involved in charging or discharging the link. $P_1$, $P_2$, $P_3$, and $P_4$ are power corresponding the input and output phase pairs that do not have the maximum line to line voltages. The following equations describe the behavior of the converter, and can be used to derive the duty cycle of each switch:

$$V_1 = \frac{1}{2}(V_{p1})t_1 f$$

$$V_2 = \frac{1}{2}(V_{p1} + V_{p2})t_2 f$$

$$V_3 = \frac{1}{2}(V_{p3} + V_{p2})t_3 f$$

-continued $$V_4 = \frac{1}{2}(V_{p3})t_4 f$$

$$I_1 = C\frac{V_{p1}}{t_1}$$

$$I_2 = C\frac{V_{p2} - V_{p1}}{t_2}$$

$$I_3 = C\frac{V_{p2} - V_{p3}}{t_3}$$

$$I_4 = C\frac{V_{p3}}{t_4}$$

$$P_1 = V_1 \times I_1 = \frac{1}{2}(V_{p1})^2 Cf \Rightarrow V_{p1} = \sqrt{\frac{2P_1}{Cf}}$$

$$P_2 = \frac{1}{2}((V_{p2})^2 - (V_{p1})^2)Cf \Rightarrow V_{p2} = \sqrt{\frac{2(P_1 + P_2)}{Cf}}$$

$$P_3 = \frac{1}{2}((V_{p2})^2 - (V_{p3})^2)Cf \Rightarrow V_{p3} = \sqrt{\frac{2(P_1 + P_2 - P_3)}{Cf}} = \sqrt{\frac{2P_4}{Cf}}$$

$$P_4 = \frac{1}{2}(V_{p3})^2 Cf$$

$$D_1 = t_1 f = \frac{2V_1}{\sqrt{\frac{2P_1}{Cf}}}$$

$$D_2 = t_2 f = \frac{2V_2}{\sqrt{\frac{2P_1}{Cf}} + \sqrt{\frac{2(P_1+P_2)}{Cf}}}$$

$$D_3 = t_3 f = \frac{2V_3}{\sqrt{\frac{2P_4}{Cf}} + \sqrt{\frac{2(P_1+P_2)}{Cf}}}$$

$$D_4 = t_4 f = \frac{2V_4}{\sqrt{\frac{2P_4}{Cf}}}$$

$$D_5 = 1 - (D_1 + D_2 + D_3 + D_4)$$

Figure 26:
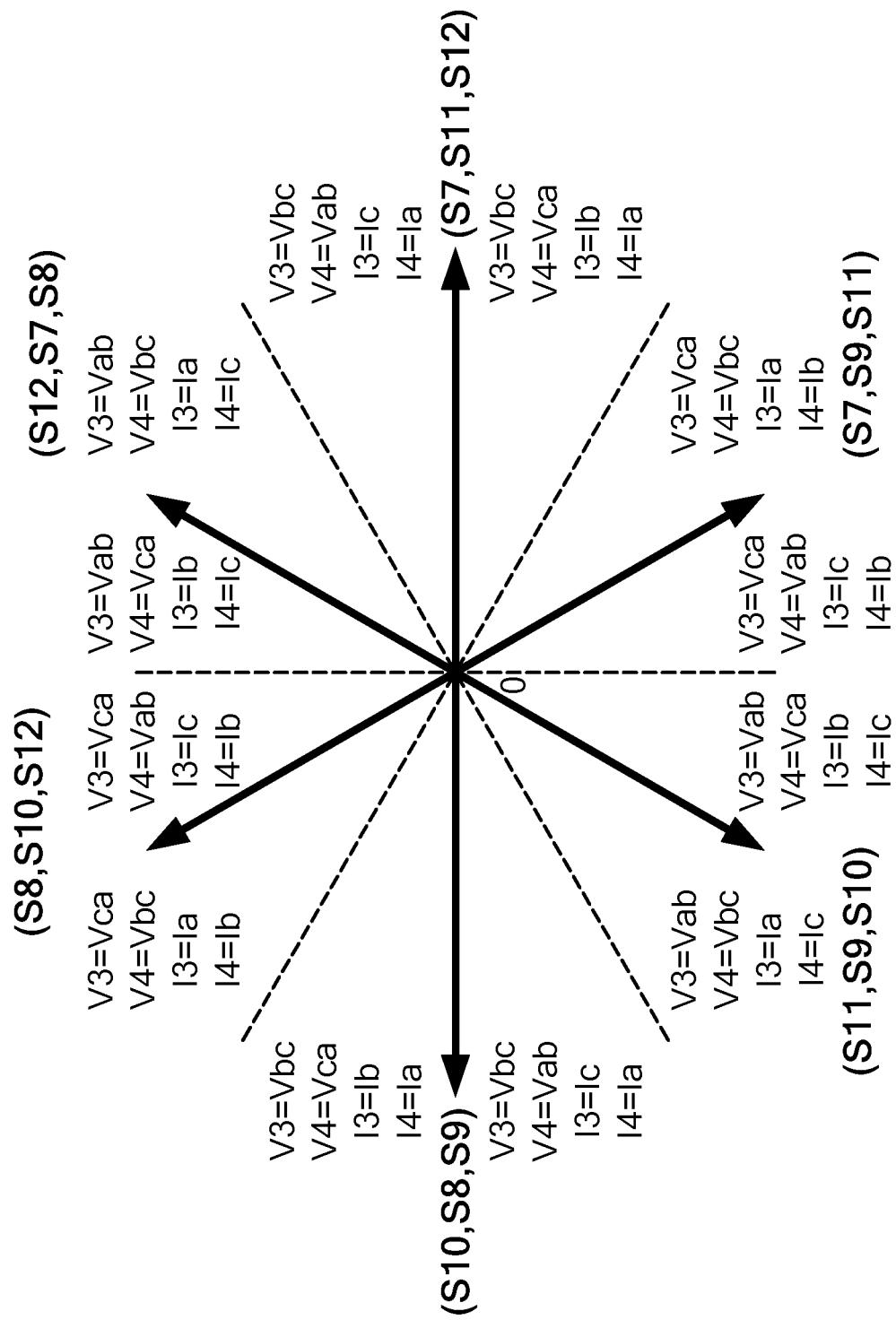
FIG. 26 illustrates switch selection space vectors for an output side according to one or more embodiments.

In order to find $V_1$, $V_2$, $V_3$, $V_4$, $I_1$, $I_2$, $I_3$, and $I_4$ at each moment, the space vectors can be used. FIG. 26 shows the output side switch selection and voltage/current values for the output side assuming unity PF.

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

It will be appreciated that the various features of the embodiments described herein can be combined in a variety of ways. For example, a feature described in conjunction with one embodiment may be included in another embodiment even if not explicitly described in conjunction with that embodiment.

The present invention has been described in conjunction with certain preferred embodiments. It is to be understood that the invention is not limited to the exact details of construction, operation, exact materials or embodiments shown and described, and that various modifications, substitutions of equivalents, alterations to the compositions, and other changes to the embodiments disclosed herein will be apparent to one of skill in the art.

We claim:

1. A power conversion device comprising:
an input stage comprising a plurality of forward-blocking bidirectional-conducting devices that are controllable in at least one direction, wherein the input stage is configured to be coupled to a power source;
a link stage comprising at least one reactive component; and
an output stage comprising a plurality of forward-blocking bidirectional-conducting devices that are controllable in at least one direction, wherein the output stage is configured to be coupled to a load and control current output to the load;
wherein the device is operative in a continuous conduction mode or a discontinuous conduction mode or in a boundary of continuous conduction mode and discontinuous conduction mode and wherein each of the forward-blocking bidirectional-conducting devices comprises a single controllable switching device and an anti-parallel diode on a single current path between the link stage and the input stage or the link stage and the output stage; and
wherein the device is operative to charge the link stage from the power source in one or more consecutive input modes until, for each input mode, a voltage across an input phase pair of the power source reaches a reference voltage, and is operative to discharge the link stage to the load in one or more consecutive output modes, and one or more of:
wherein in the continuous conduction mode, the device is operative for each output mode to discharge the link stage until a voltage across an output phase pair reaches a reference voltage;
wherein in the continuous conduction mode or the discontinuous conduction mode, the device is operative at a mode with no current passing the link stage and zero or constant voltage drop across the link stage, and for each output mode except a last mode, to discharge the link stage until a voltage across an output phase pair reaches a reference voltage and for the last mode, to discharge the link stage until a voltage across the link stage reaches zero; and
wherein in the boundary of the continuous conduction mode and the discontinuous conduction mode, the device is operative for each output mode except a last mode to discharge the link stage until a voltage across an output phase pair reaches a reference voltage, and for the last mode, to discharge the link stage until a voltage across the link stage reaches zero.

2. The device of claim 1, wherein the link stage comprises at least one reactive component of a series partially resonant inductor-capacitor (LC) circuit.

3. The device of claim 2, wherein the at least one reactive component of the series partially resonant LC circuit comprises a capacitor, and wherein the series resonant LC circuit is formed by capacitance of the capacitor together with parasitic inductance of the capacitor.

4. The device of claim 2, wherein the series partially resonant LC circuit comprises an inductor connected in series with a capacitor, and wherein the series partially resonant LC circuit is formed by inductance of the inductor together with capacitance of the capacitor.

5. The device of claim 2, wherein the series partially resonant link circuit has a frequency that is greater than a frequency of the power source.

6. The device of claim 1, wherein the link stage comprises at least two reactive components of a series partially resonant circuit, wherein the series partially resonant circuit is configured for alternating current (AC) operation.

7. The device of claim 1, wherein the power source is a direct current (DC) power source.

8. The device of claim 1, wherein the power source is an AC power source having a predetermined number of phases.

9. The device of claim 8, wherein the predetermined number of phases is three phases.

10. The device of claim 1, wherein the load is a direct current (DC) load.

11. The device of claim 1, wherein the load is an AC load having a predetermined number of phases.

12. The device of claim 11, wherein the predetermined number of phases is three phases.

13. The device of claim 1, wherein the at least one reactive component of the series partially resonant circuit comprises a galvanic isolation device, wherein the series partially resonant circuit further comprises a first capacitive device connected in series to a first terminal of the galvanic isolation device and a second capacitive device connected in series to a second terminal of the galvanic isolation device, and wherein the series partially resonant circuit is formed by leakage inductance of the galvanic isolation device together with capacitance of the first capacitive device and the second capacitive device.

14. The device of claim 1, wherein the plurality of bidirectional-conducting forward-blocking devices of the input stage are insulated-gate bipolar transistors with anti-parallel diodes.

15. The device of claim 1, wherein the plurality of bidirectional-conducting forward-blocking devices of the input stage are controlled rectifiers with anti-parallel diodes.

16. The device of claim 1, wherein the link stage is arranged in series between the input stage and the output stage.

17. The device of claim 1, wherein the link stage is arranged in parallel between the input stage and the output stage.

18. The device of claim 1, wherein the link stage comprises a film capacitor, a ceramic capacitor, or an electrolytic capacitor.

19. The device of claim 1, further comprising one or more processors and memory, and machine-readable instructions stored in the memory that, upon execution by the one or more processors cause, and/or circuitry that causes the device to carry out operations comprising operating the device in the continuous conduction mode or the discontinuous conduction mode.

20. The device of claim 19, further comprising operating the device at a fixed frequency.

21. The device of claim 19, further comprising calculating a duty cycle of each of the bidirectional conducting devices, to regulate the current and voltage.

22. The device of claim 1, further comprising one or more processors and memory, and machine-readable instructions stored in the memory that, upon execution by the one or more processors cause, and/or circuitry that causes the device to carry out operations comprising operating the device in the continuous conduction mode.

23. The device of claim 22, further comprising operating the device at a variable frequency.

24. The device of claim 22, further comprising calculating a duty cycle of each of the bidirectional conducting devices, to regulate the current and voltage.

25. The device of claim 1, further comprising one or more processors and memory, and machine-readable instructions stored in the memory that, upon execution by the one or more processors cause, and/or circuitry that causes the device to carry out operations comprising operating the device in the boundary of the continuous conduction mode and the discontinuous conduction mode.

26. The device of claim 25, further comprising operating the device at a variable frequency.

27. The device of claim 25, further comprising calculating a duty cycle of each of the bidirectional conducting devices, to regulate the current and voltage.

28. A method of controlling a power conversion device, comprising:
providing a power conversion device comprising:
an input stage comprising a plurality of forward-blocking bidirectional-conducting devices that are controllable in at least one direction, wherein the input stage is configured to be coupled to a power source;
a link stage comprising at least one reactive component; and
an output stage comprising a plurality of forward-blocking bidirectional-conducting devices that are controllable in at least one direction, wherein the output stage is configured to be coupled to a load and control current output to the load; and
operating the device in a discontinuous conduction mode, comprising:
charging the link stage from the power source in one or more consecutive input modes until, for each input mode, a voltage across an input phase pair of the power source reaches a reference voltage; and
discharging the link stage to the load in one or more consecutive output modes until, for each output mode except for a last output mode, a voltage across an output phase pair reaches a reference voltage and for the last output mode discharging the link stage until a voltage across the link stage reaches zero.

29. The method of claim 28, further comprising operating the device at a fixed frequency.

30. The method of claim 28, further comprising calculating a duty cycle of each of the bidirectional conducting devices, to regulate the current and voltage.

31. A method of controlling a power conversion device, comprising:
providing a power conversion device comprising:
an input stage comprising a plurality of forward-blocking bidirectional-conducting devices that are controllable in at least one direction, wherein the input stage is configured to be coupled to a power source;
a link stage comprising at least one reactive component; and
an output stage comprising a plurality of forward-blocking bidirectional-conducting devices that are controllable in at least one direction, wherein the output stage is configured to be coupled to a load and control current output to the load; and
operating the device in a continuous conduction mode, comprising:
charging the link stage from the power source in one or more consecutive input modes until, for each input mode, a voltage across an input phase pair of the power source reaches a reference voltage; and
discharging the link stage to the load in one or more consecutive output modes until, for each output mode, a voltage across an output phase pair reaches a reference voltage.

32. The method of claim 31, further comprising operating the device at a variable frequency.

33. The method of claim 31, further comprising calculating a duty cycle of each of the bidirectional conducting devices, to regulate the current and voltage.

34. A method of controlling a power conversion device, comprising:
providing a power conversion device comprising:
an input stage comprising a plurality of forward-blocking bidirectional-conducting devices that are controllable in at least one direction, wherein the input stage is configured to be coupled to a power source;
a link stage comprising at least one reactive component; and
an output stage comprising a plurality of forward-blocking bidirectional-conducting devices that are controllable in at least one direction, wherein the output stage is configured to be coupled to a load and control current output to the load; and
operating the device in a boundary of continuous conduction mode and discontinuous conduction mode, comprising:
charging the link stage from the power source in one or more consecutive input modes until, for each input mode, a voltage across an input phase pair of the power source reaches a reference voltage; and
discharging the link stage to the load in one or more consecutive output modes, until for a first output mode, a voltage across an output phase pair reaches a reference voltage, and for a last output mode, a voltage across the link stage reaches zero.

35. The method of claim 34, further comprising operating the device at a variable frequency.

36. The method of claim 34, further comprising calculating a duty cycle of each of the bidirectional conducting devices, to regulate the current and voltage 37. A power conversion device comprising:
an input stage comprising a plurality of forward-blocking bidirectional-conducting devices or bidirectional-blocking bidirectional-conducting devices that are controllable in at least one direction, wherein the input stage is configured to be coupled to a power source;
a link stage comprising at least one reactive component; and
an output stage comprising a plurality of forward-blocking bidirectional-conducting devices or bidirectional-blocking bidirectional-conducting devices that are controllable in at least one direction, wherein the output stage is configured to be coupled to a load and control current output to the load;
wherein the device is operative in a continuous conduction mode or a discontinuous conduction mode or in a boundary of continuous conduction mode and discontinuous conduction mode, including charging the link stage from the power source in one or more consecutive input phases, and discharging the link stage to the load in one or more consecutive output phases; and wherein:
in the discontinuous conduction mode or the continuous conduction mode, operating the device at a phase with no current passing the link stage and zero or constant voltage drop across the link stage and in a last phase, discharging the link stage until a voltage across the link stage reaches zero; or
in the continuous conduction mode, discharging the link stage further comprises for each output phase, discharging the link stage until a voltage across an output phase pair reaches a reference voltage; or
in the boundary of continuous conduction mode and discontinuous conduction mode, discharging the link stage further comprises, for output phases except a last phase, discharging the link stage until a voltage across an output phase pair reaches a reference voltage, and for the last phase, discharging the link stage until a voltage across the link stage reaches zero.

* * * * *